US012061434B2

(12) United States Patent
Ishio

(10) Patent No.: US 12,061,434 B2
(45) Date of Patent: Aug. 13, 2024

(54) IMAGE FORMING APPARATUS TO REDUCE OR SUPPRESS LEAKAGE OF TONER

(71) Applicant: CANON KABUSHIKI KAISHA, Tokyo (JP)

(72) Inventor: Shohei Ishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,937

(22) Filed: Feb. 9, 2023

(65) Prior Publication Data

US 2023/0266705 A1 Aug. 24, 2023

(30) Foreign Application Priority Data

Feb. 22, 2022 (JP) ................................ 2022-025370

(51) Int. Cl.
*G03G 15/28* (2006.01)
*G03G 15/08* (2006.01)
*G03G 21/00* (2006.01)

(52) U.S. Cl.
CPC ..... *G03G 21/0011* (2013.01); *G03G 15/0889* (2013.01)

(58) Field of Classification Search
CPC ................................................ G03G 15/0889
USPC ........................................................ 399/350
See application file for complete search history.

(56) References Cited

FOREIGN PATENT DOCUMENTS

| | | | | |
|---|---|---|---|---|
| JP | 2003223085 A | | 8/2003 | |
| JP | 2021076823 A | | 5/2021 | |
| JP | 2021086092 A | * | 6/2021 | ......... G03G 15/0875 |
| JP | 2021086092 A | | 6/2021 | |

* cited by examiner

*Primary Examiner* — Quana Grainger
(74) *Attorney, Agent, or Firm* — Canon U.S.A., Inc. I.P. Division

(57) ABSTRACT

An image bearing member includes an agitation member and a sheet member. A sheet portion of an agitation member comes into contact with a second side surface of the blade member. When viewed from a rotation axis direction of a shaft portion of the agitation member, an imaginary line A connects a position of an end portion on a most upstream side of the second side surface in the rotation direction and an axial center position of the shaft portion, and an imaginary line B is orthogonal to the imaginary line A and passes through the position of the end portion on the most upstream side of the second side surface, and the free end of the sheet member is disposed at a position closer to the blade member than a position where a second line intersects with an outer circumferential surface of the image bearing member.

15 Claims, 19 Drawing Sheets

IMAGE FORMING APPARATUS TO REDUCE OR SUPPRESS LEAKAGE OF TONER

BACKGROUND

Field

The present disclosure generally relates to an image forming apparatus. Specifically, the present disclosure relates to an image forming apparatus employing an electrophotographic system to reduce or suppress leakage of toner.

Description of the Related Art

Image forming apparatuses employing an electrophotographic system have been known as a type of the apparatus that includes a belt in an intermediate transfer body and a cleaning unit for a cleaning operation on the belt.

Specifically, the cleaning unit according to a configuration discussed in Japanese Patent Application Laid-Open No. 2021-76823 includes a blade member which is in contact with a belt to collect toner, a sheet member for preventing the toner from leaking to an external portion from a unit frame body, and a rotatable agitation member disposed in a vicinity of the blade member and the sheet member.

A free end of the blade member in contact with the belt extends upstream in a belt rotation direction. On the other hand, the sheet member is disposed upstream from the blade member in the belt rotation direction. A free end of the sheet member in contact with the belt extends downstream in the belt rotation direction, and a nip portion is formed between the sheet member and the belt.

The agitation member includes a rotatable shaft portion and a sheet portion fixed to the shaft portion, and a free end of the sheet portion comes into contact with the blade member on a side opposite to the belt. Accordingly, when the agitation member is rotated, the free end of the sheet portion rubs the blade member.

SUMMARY

The present disclosure is directed to an image forming apparatus capable of reducing leaking of developer to an outside, in a configuration in which an agitation member is arranged in a vicinity of a blade member and a sheet member.

According to some embodiments, an image forming apparatus includes a rotatable image bearing member configured to bear a toner image, a blade member configured to collect a developer on the image bearing member, the blade member including a first side surface in contact with the image bearing member and a second side surface which is on a side opposite to the first side surface in a thickness direction of the blade member intersecting with a rotation direction of the image bearing member, wherein, in a state where the blade member is viewed from a direction orthogonal to the rotation direction of the image bearing member, a contact portion where the first side surface is in contact with the image bearing member is disposed upstream from a position where the blade member is fixed to a supporting member in the rotation direction, a sheet member configured to be in contact with the image bearing member at a position, in the rotation direction, upstream from a position where the blade member is in contact with the image bearing member, wherein, in a state where the sheet member is viewed from the direction orthogonal to the rotation direction, the sheet member is fixed at one end and is in contact with the image bearing member at another end serving as a free end, and an agitation member including a shaft portion disposed rotatably and a sheet portion that is mounted on the shaft portion and rotated with rotation of the shaft portion, the sheet portion being elastically deformable and being configured to come into contact with the second side surface, wherein, in a state where the sheet member is viewed from a rotation axis direction of the shaft portion orthogonal to the rotation direction, and when an imaginary line which connects a position of an end portion on a most upstream side of the second side surface in the rotation direction and an axial center position of the shaft portion is a first line, and an imaginary line which is orthogonal to the first line and passes through the position of the end portion on the most upstream side of the second side surface is a second line, the free end of the sheet member is disposed at a position closer to the blade member than a position where the second line intersects with an outer circumferential surface of the image bearing member.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described below with reference to the drawings that may have different characteristics, advantages, disadvantages, performance parameters, or the like.

A first exemplary embodiment of the present disclosure will be described with reference to FIGS. 1 to 16.

Sizes, materials, shapes and relative arrangements of constituent elements described in the below-described exemplary embodiments can be changed as appropriate depending on a configuration and various conditions of an apparatus to which the present disclosure is applied. Further, a scope of the present disclosure is not limited to the below-described exemplary embodiments unless otherwise specified.

Figure 1:
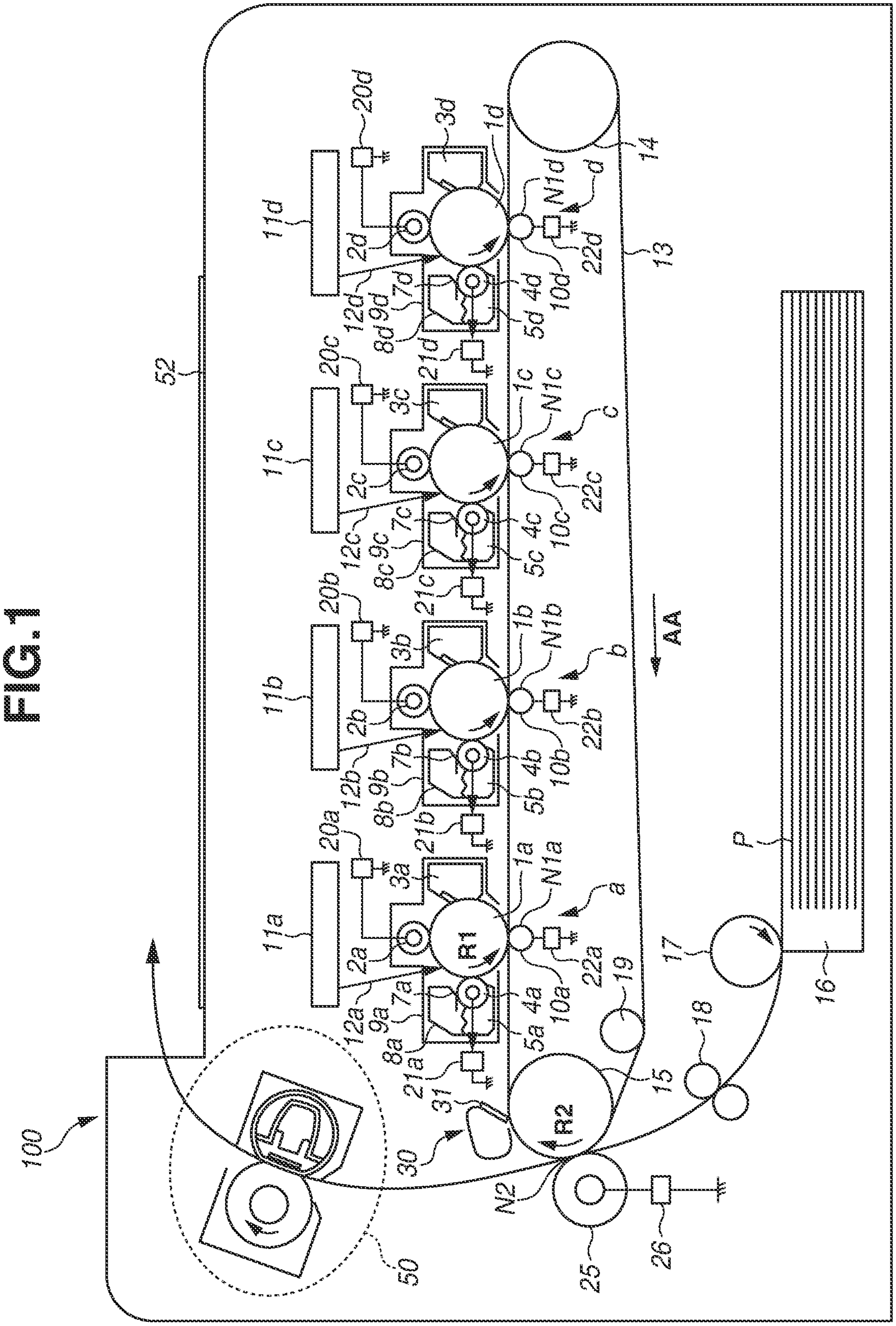
FIG. 1 is a conceptual diagram illustrating an entire body of an image forming apparatus according to a first exemplary embodiment of the present disclosure.

FIG. 1 is a conceptual diagram illustrating an entire body of an image forming apparatus 100 according to the present exemplary embodiment of the present disclosure.

The image forming apparatus 100 according to the present exemplary embodiment is a tandem-type image forming apparatus which includes a plurality of image forming units a to d. A first image forming unit a, a second image forming unit b, a third image forming unit c and a fourth image forming unit d form images with toner (hereinbelow also referred to as developer) of respective colors of yellow (Y), magenta (M), cyan (C), and black (Bk).

The above-described four units, i.e., the first to fourth image forming units a to d are arranged in a row at regular intervals, and configurations of the first to fourth image forming units a to d are substantially similar to each other except for the respective colors of toner stored in the first to fourth image forming units a to d. Hereinafter, the image forming apparatus 100 according to the present exemplary embodiment will be described by using the first image forming unit a as an example.

A photosensitive drum 1*a* serving as a photosensitive member (image bearing member) includes a metallic cylinder on which a multi-layered functional organic material is laminated. The multi-layered functional organic material includes a plurality of layers including a carrier generation layer, which is exposed to light and generates electric charges, and a charge transport layer, which transports the generated electric charges. An outermost layer of the plurality of layers has a low electric conductivity and is almost electrically insulated. The photosensitive drum 1*a* is rotated in a direction of an arrow R1 indicated in FIG. 1 at a predetermined circumferential speed by a driving force received from a driving power source (not illustrated).

A charging roller 2*a* serving as a charging member is in contact with the photosensitive drum 1*a* and uniformly charges a surface of the photosensitive drum 1*a* while being rotated with the rotation of the photosensitive drum 1*a* in the direction of the arrow R1 indicated in FIG. 1. A charging power source 20*a* applies a direct-current voltage to the charging roller 2*a*, and the charging roller 2*a* electrically charges the photosensitive drum 1*a* by an electric discharge that occurs in minute air gaps on the upstream and downstream sides of a charging portion where the charging roller 2*a* is in contact with the photosensitive drum 1*a*.

A development unit 8*a* includes a development roller 4*a* and a developer application blade 7*a* that serve as development members, and a developer storage portion 5*a* that stores yellow toner. The development roller 4*a* is connected to a development power source 21*a*. A cleaning unit 3*a* includes a cleaning blade, which is in contact with the photosensitive drum 1*a*, and a waste toner box, which stores toner removed from the photosensitive drum 1*a* by the cleaning blade, and collects toner remaining on the photosensitive drum 1*a*.

An exposure unit 11*a* includes a scanner unit for laser light scanning using a polygonal mirror, and irradiates the photosensitive drum 1*a* with a scanning beam 12*a* modulated based on an image signal. The photosensitive drum 1*a*, the charging roller 2*a*, the cleaning unit 3*a*, and the development unit 8*a* are included in an integrated process cartridge 9*a* attachable to and detachable from the image forming apparatus 100.

An intermediate transfer belt 13 (i.e., image bearing member) is a rotatable endless belt that bears a toner image (developer). The intermediate transfer belt 13 is stretched by three rollers, i.e., a secondary transfer counter roller 15 (hereinafter, called "counter roller 15"), a tension roller 14, and an auxiliary roller 19, which serve as stretching members. The tension roller 14 is urged by a spring (not illustrated) in such a manner that the tension roller 14 maintains a suitable tension with respect to the intermediate transfer belt 13.

The counter roller 15 is rotated in a direction of an arrow R2 indicated in FIG. 1 by receiving a driving force from a driving source (not illustrated). With the rotation of the counter roller 15, the intermediate transfer belt 13 is moved in a direction of an arrow AA indicated in FIG. 1, i.e., a rotation and surface movement direction of the intermediate transfer belt 13. The intermediate transfer belt 13 is movable in a forward direction with respect to the photosensitive drums 1*a* to 1*d* at the substantially uniform speed.

The auxiliary roller 19, the tension roller 14, and the counter roller 15 are grounded electrically. The counter roller 15 has an outer diameter of 24.0 mm, and is configured of an aluminum core metal covered with ethylene propylene diene monomer (EPDM) rubber having a thickness of 0.5 mm. Carbon that is used as a conductive agent is scattered on the EPDM rubber in such a manner that electrical resistance of the counter roller 15 is adjusted to approximately $1\times10^5\Omega$.

A primary transfer roller 10a is disposed at a position opposite to the photosensitive drum 1a with the intermediate transfer belt 13 disposed in between the primary transfer roller 10a and the photosensitive drum 1a. The primary transfer roller 10a is in contact with an inner circumferential surface of the intermediate transfer belt 13, and is rotated with the movement of the intermediate transfer belt 13.

A secondary transfer roller 25 is disposed at a position opposite to the counter roller 15 with the intermediate transfer belt 13 disposed in between the secondary transfer roller 25 and the intermediate transfer belt 13, and is in contact with an outer circumferential surface of the intermediate transfer belt 13. Further, the secondary transfer roller 25 is connected to a secondary transfer power source 26.

Next, an image forming operation executed by the image forming apparatus 100 according to the present disclosure will be described.

The image forming operation is started when a control unit (not illustrated), such as a controller, receives an image signal, and the photosensitive drums 1a to 1d and the counter roller 15 are rotated at a predetermined circumferential speed (processing speed) by receiving driving force from a driving source (not illustrated). In the present exemplary embodiment, the processing speed is 200 millimeters per second (mm/s).

The photosensitive drum 1a is uniformly charged by the charging roller 2a to which a voltage having the same polarity as a normal charging polarity of toner (in the present exemplary embodiment, a negative polarity) is applied from the charging power source 20a. Then, the photosensitive drum 1a is irradiated with the scanning beam 12a emitted from the exposure unit 11a, and an electrostatic latent image according to image information is formed on the photosensitive drum 1a.

Toner stored in the development unit 8a is charged in a negative polarity and applied to the development roller 4a by the developer application blade 7a. Then, a predetermined voltage is applied to the development roller 4a from the development power source 21a, and the electrostatic latent image is developed with toner at a development portion between the development roller 4a and the photosensitive drum 1a, and a toner image corresponding to a yellow image component is formed on the photosensitive drum 1a.

After the above-described operation, with the rotation of the photosensitive drum 1a, the yellow toner image borne on the photosensitive drum 1a reaches a primary transfer portion N1a at which the photosensitive drum 1a is in contact with the intermediate transfer belt 13.

Then, a voltage having a positive polarity is applied to the primary transfer roller 10a from a primary transfer power source 22a, and the yellow toner image is primary transferred to the intermediate transfer belt 13 from the photosensitive drum 1a at the primary transfer portion N1a.

Similarly, a second color (magenta) toner image, a third color (cyan) toner image, and a fourth color (black) toner image are formed by the second, the third, and the fourth image forming units b, c, and d, respectively, and the toner images are sequentially primary-transferred to the intermediate transfer belt 13 in a manner such that the toner images are superimposed on one another.

By the above-described operation, a four-color toner image corresponding to a target color image is formed on the intermediate transfer belt 13.

The four-color toner image borne on the intermediate transfer belt 13 is collectively secondary-transferred on a surface of a transfer material P, such as a sheet of paper or an overhead projector (OHP) sheet, when the four-color toner image passes through a secondary transfer portion N2 at which the secondary transfer roller 25 is in contact with the intermediate transfer belt 13. In this operation, a voltage having a positive polarity is applied to the secondary transfer roller 25 from the secondary transfer power source 26, whereby the toner image is secondary-transferred to the transfer material P from the intermediate transfer belt 13 at the secondary transfer portion N2.

The transfer material P is stored in a sheet feeding cassette 16. After the transfer material P is fed to the conveyance rollers 18 from the sheet feeding cassette 16, the transfer material P is conveyed to the secondary transfer portion N2 by conveyance rollers 18. Then, the transfer material P, on which the four-color toner image is transferred at the secondary transfer portion N2, is heated and pressurized by a fixing unit 50, and four colors of toner are fused, mixed, and fixed to the transfer material P. Then, the transfer material P is discharged from the image forming apparatus 100 and stacked on a discharge tray 52 serving as a stacking unit.

By the above-described operation, a full-color printed image is formed.

Transfer residual toner remaining on the intermediate transfer belt 13 after the secondary transfer operation is removed from the surface of the intermediate transfer belt 13 by a belt cleaning unit 30 (toner collection unit) disposed at a position opposite to the counter roller 15 with the intermediate transfer belt 13 disposed in between the belt cleaning unit 30 and the counter roller 15. As described below, the belt cleaning unit 30 includes a cleaning blade 31 (blade member) in contact with the outer circumferential surface of the intermediate transfer belt 13 at a position opposite to the counter roller 15.

The cleaning blade 31 has a free end 31b that is in contact with the intermediate transfer belt 13 and extends to the upstream side in the rotation direction AA of the intermediate transfer belt 13, and collects toner from the intermediate transfer belt 13.

The image forming apparatus 100 according to the present exemplary embodiment includes a control substrate (not illustrated) on which an electric circuit for controlling operations of each unit of the image forming apparatus 100 is mounted.

A central processing unit (CPU) (not illustrated) serving as a control unit and a memory (not illustrated) serving as a storage unit for storing various types of control information are mounted on the control substrate. The CPU includes one or more processors, circuitry, or combinations thereof, and executes various types of control, such as conveyance control of the transfer material P, driving control of the intermediate transfer belt 13 and the process cartridges 9, image forming control, and malfunction detection control.

Next, a configuration of the intermediate transfer belt 13 according to the present exemplary embodiment will be described.

The intermediate transfer belt 13 is an endless belt member (or a film-like member) including two layers, i.e., a base layer and a surface layer, and having a circumferential length of 700 millimeters (mm). In the present exemplary embodiment, the base layer is defined as a layer which is the thickest among the layers of the intermediate transfer belt 13 in the thickness direction of the intermediate transfer belt 13.

In the present exemplary embodiment, the base layer has a thickness of 70 micrometers (μm). The surface layer is a layer formed on the outer circumferential surface of the intermediate transfer belt 13, and has a thickness of 3 μm.

<Cleaning Unit>

Next, a configuration of the belt cleaning unit 30 (cleaning unit) as one feature of the present exemplary embodiment will be described.

Figure 2A:
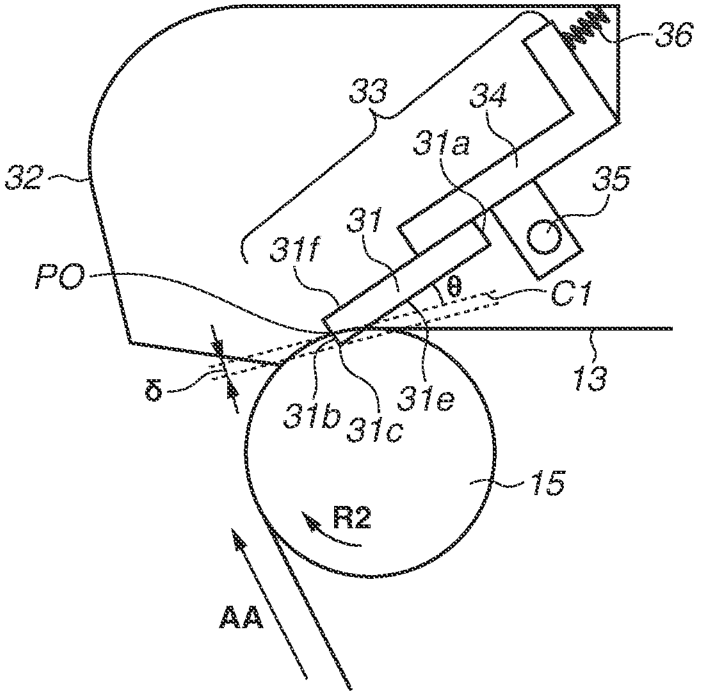
FIG. 2A is a conceptual diagram illustrating a mounting condition of a cleaning blade of a belt cleaning unit according to the first exemplary embodiment.
Figure 2B:
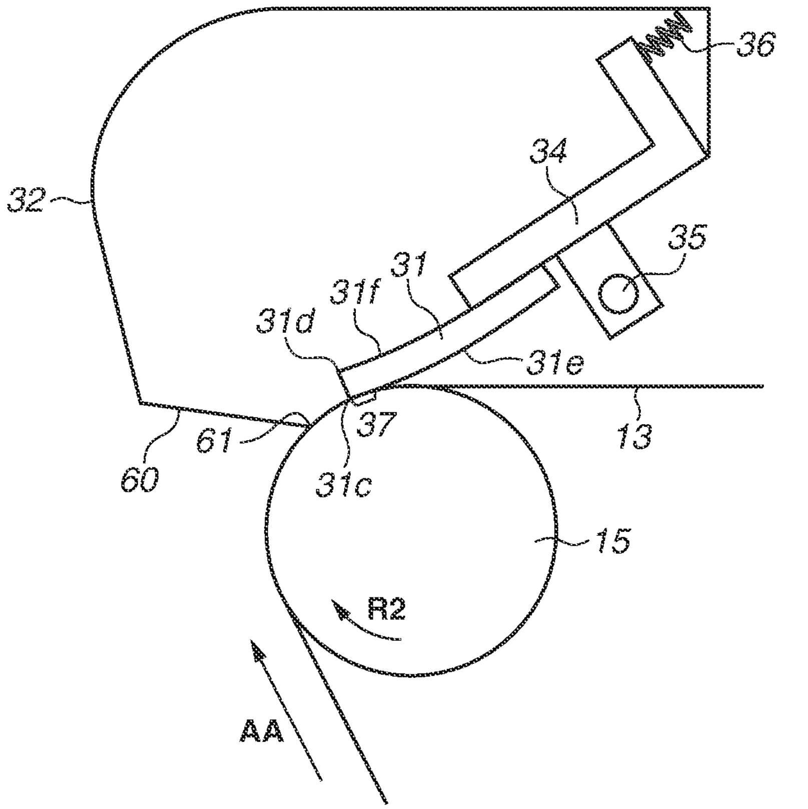
FIG. 2B is a conceptual diagram illustrating a state where the cleaning blade is mounted.

FIG. 2A is a conceptual diagram illustrating a mounting condition of the cleaning blade 31 of the belt cleaning unit 30 according to the present exemplary embodiment. FIG. 2B is a conceptual diagram illustrating a state where the cleaning blade 31 is mounted.

Specifically, FIG. 2A conceptually illustrates a mounting position of the cleaning blade 31 described below when the cleaning blade 31 is not deformed elastically.

As illustrated in FIG. 2A, the belt cleaning unit 30 includes a cleaning container 32 and a cleaning action part 33 disposed in the cleaning container 32.

The cleaning container 32 is configured as a part of a frame body of an intermediate transfer unit (not illustrated) which includes the intermediate transfer belt 13.

The cleaning action part 33 includes a cleaning blade 31 (blade member) serving as a cleaning member and a supporting member 34 for supporting the cleaning blade 31.

In the present exemplary embodiment, the cleaning blade 31 is an elastic blade formed of an elastic material, such as urethane (polyurethane) rubber, and the cleaning blade 31 is adhered to and supported by the supporting member 34 formed of a sheet metal made of a plated steel sheet material.

Further, the cleaning blade 31 is a plate-like member having a length in a width direction of the intermediate transfer belt 13 (a lengthwise direction of the cleaning blade 31), i.e., a direction intersecting with the moving direction of the intermediate transfer belt 13 indicated by an arrow AA (rotation direction AA).

Further, in the lateral direction of the cleaning blade 31, the free end 31*b* and a blade contact end portion 31*c* of a first side surface 31*e* of the cleaning blade 31 disposed on a side of the intermediate transfer belt 13 is in contact with the intermediate transfer belt 13. Then, a second side surface 31*f* of the cleaning blade 31 on the opposite side of the intermediate transfer belt 13 is adhered and fixed to the supporting member 34. In other words, the cleaning blade 31 is fixed to the supporting member 34 at the one end in a state where the cleaning blade 31 is viewed in a direction orthogonal to the rotation direction of the intermediate transfer belt 13. Further, another end, i.e., the free end 31*b*, disposed upstream from the one end in the rotation direction of the intermediate transfer belt 13 is in contact with the intermediate transfer belt 13.

In the present exemplary embodiment, the cleaning blade 31 has a length of 240 mm in the lengthwise direction, a thickness of 2 mm, and hardness of 77 degrees according to a standard of JIS K 6253, and may have other configurational dimensions and properties.

The cleaning action part 33 is swingably disposed with respect to the surface of the intermediate transfer belt 13. In other words, the supporting member 34 is swingably supported by a swinging shaft 35 fixed to the cleaning container 32 with respect to the surface of the intermediate transfer belt 13. The supporting member 34 is pressurized by a pressure spring 36 serving as an urging unit disposed inside the cleaning container 32, and the cleaning action part 33 is able to move about the swinging shaft 35 as a center, and the cleaning blade 31 is urged (pressed) against the intermediate transfer belt 13.

The counter roller 15 is disposed on the inner circumference side of the intermediate transfer belt 13 at a position opposite to the cleaning blade 31. At a position opposite to the counter roller 15, the cleaning blade 31 is in contact with the surface of the intermediate transfer belt 13 in an orientation directed opposite to the moving direction of the intermediate transfer belt 13. In other words, the cleaning blade 31 is in contact with the surface of the intermediate transfer belt 13 in a state where the free end 31*b* in the lateral direction of the cleaning blade 31 faces the upstream side in the moving direction of the intermediate transfer belt 13.

As illustrated in FIG. 2B, a blade nip portion 37 is formed between the cleaning blade 31 and the intermediate transfer belt 13. The cleaning blade 31 scrapes the transfer residual toner from the moving surface of the intermediate transfer belt 13 at the blade nip portion 37, and stores the collected toner in the cleaning container 32.

In the present exemplary embodiment, as illustrated in FIG. 2B, one portion of the free end 31*b* which is in contact with the intermediate transfer belt 13 is referred to as the blade contact end portion 31*c*, and another portion on the opposite side of the one portion in the thickness direction, which is not in contact with the intermediate transfer belt 13, is referred to as a blade non-contact end portion 31*d*. Similarly, one surface of the cleaning blade 31 on which the cleaning blade 31 is in contact with the intermediate transfer belt 13 is referred to as the first side surface 31*e*, and another surface opposite to the one surface in the thickness direction is referred to as the second side surface 31*f*. In other words, the blade non-contact end portion 31*d* is an end portion of the second side surface 31*f* on the most upstream side in the rotation direction AA of the intermediate transfer belt 13.

Further, in the present exemplary embodiment, a mounting position of the cleaning blade 31 is specified as follows.

As illustrated in FIG. 2A, the cleaning blade 31 is mounted on the frame body at a setting angle θ of 22 degrees, a penetration amount δ of 1.3 mm, and an abutting pressure of 0.6 newton centimeters (N/cm).

The setting angle θ is an angle formed between a tangential line C1 of the counter roller 15 and the cleaning blade 31 (one surface of the cleaning blade 31 substantially orthogonal to the thickness direction) at an intersection point P0 of the intermediate transfer belt 13 and the cleaning blade 31 (an edge surface of the free end 31*b* of the cleaning blade 31), i.e., a position corresponding to the blade contact end portion 31*c*. Further, the penetration amount δ is a length in the thickness direction by which the cleaning blade 31 overlaps with the counter roller 15. Then, the abutting pressure is defined by a pressing force (linear pressure in the lengthwise direction) from the cleaning blade 31 at the blade nip portion 37, and is measured by a film type pressure force measurement system (for example, product name: PINCH, manufactured by NITTA Corporation).

Generally, the cleaning blade 31 in contact with the intermediate transfer belt 13 is likely to be turned up at the initial stage because of large friction resistance of when urethane rubber (cleaning blade 31) is rubbed against synthetic resin (intermediate transfer belt 13). Thus, an initial lubricant, such as graphite fluoride, can previously be applied to the free end 31*b* of the cleaning blade 31.

While a material of the cleaning blade 31 can be selected as appropriate depending on the material of the intermediate transfer belt 13, it is desirable that the rubber for the cleaning blade 31 have a hardness within a range of 70 degrees or more and 80 degrees or less according to a standard of JIS K 6253. Further, it is also desirable that the abutting pressure of the cleaning blade 31 fall within a range of 0.4 N/cm or more and 0.8 N/cm or less.

<Scooping Sheet>

Next, constituent elements of the belt cleaning unit 30 other than the cleaning blade 31 will be described with reference to FIGS. 3A and 3B.

Figure 3A:
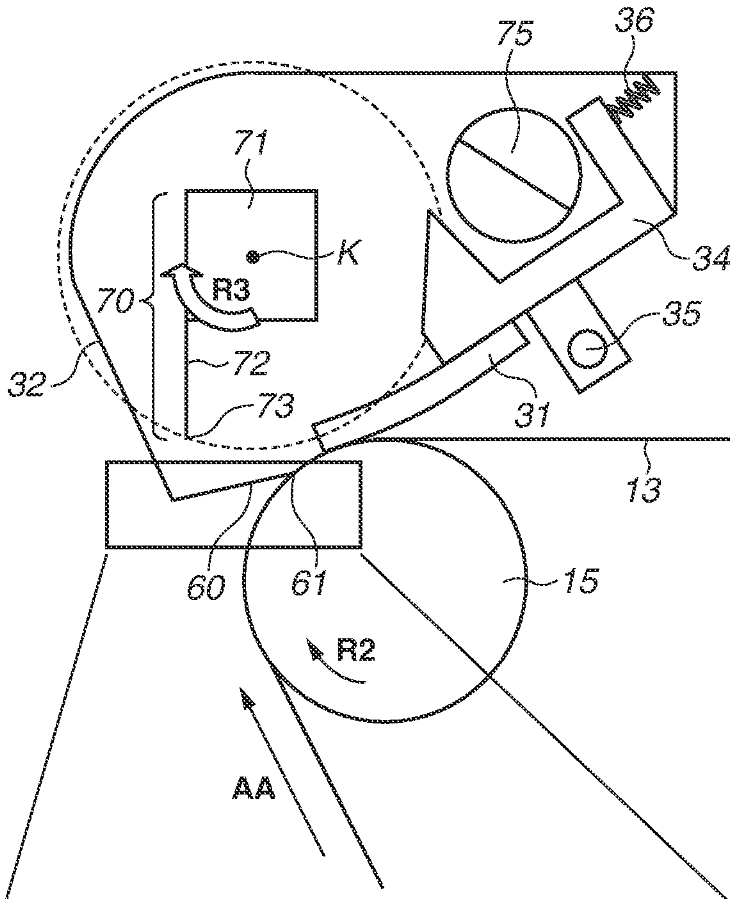
FIG. 3A is a conceptual diagram illustrating a cross-sectional view of the belt cleaning unit according to the first exemplary embodiment.
Figure 3B:
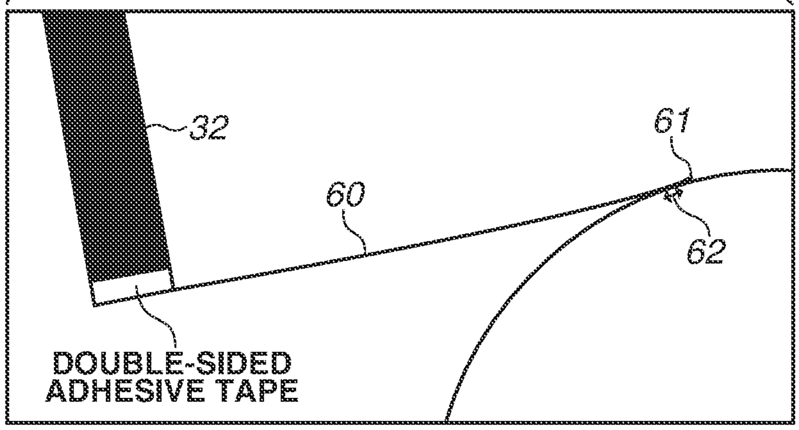
FIG. 3B is a conceptual diagram illustrating an enlarged main part of the belt cleaning unit.

FIG. 3A is a conceptual diagram illustrating a cross-sectional view of the belt cleaning unit 30 according to the present exemplary embodiment. FIG. 3B is a conceptual diagram illustrating an enlarged main part of the belt cleaning unit 30.

FIG. 3A illustrates an entire body of the belt cleaning unit 30 which also includes the components other than the cleaning blade 31. FIG. 3B illustrates a configuration in a periphery of a scooping sheet.

In the present exemplary embodiment, in order to prevent toner collected by the cleaning blade 31 from leaking out of the cleaning container 32, a scooping sheet 60 (sheet member) is disposed on the cleaning container 32 at a position opposite to the cleaning blade 31.

The scooping sheet 60 is disposed upstream from the cleaning blade 31 in the rotation direction AA of the intermediate transfer belt 13, and a free end 61 of the scooping sheet 60 extends toward the downstream side of the rotation direction AA and is in contact with the intermediate transfer belt 13.

Specifically, the scooping sheet 60 is formed of a mylar sheet, and an end portion of the scooping sheet 60 on one side is adhered and fixed to the cleaning container 32 with a double-sided adhesive tape. An unfixed end portion of the scooping sheet 60 on a side opposite to the one side serves as the free end 61.

The scooping sheet 60 forms a scooping sheet contact nip 62 where the side of the free end 61 of the scooping sheet 60 is in contact with the intermediate transfer belt 13. An edge surface (edge portion) of the free end 61 of the scooping sheet 60 may form the scooping sheet contact nip 62 by being in contact with the intermediate transfer belt 13. A portion in contact with the intermediate transfer belt 13 may not be the edge surface (edge portion) of the free end 61 of the scooping sheet 60, and the scooping sheet contact nip 62 may be formed by a side surface in a vicinity of the edge surface of the free end 61 of the scooping sheet 60.

In the present exemplary embodiment, the scooping sheet contact nip 62 is formed in an area wider than a lengthwise area of the cleaning blade 31 in the rotation axis direction of the intermediate transfer belt 13, i.e., the width direction orthogonal to the belt rotation direction.

The free end 61 of the scooping sheet 60 extends downstream in the rotation direction of the intermediate transfer belt 13.

In the present exemplary embodiment, a mylar sheet having a thickness of 50 μm, a length of 250 mm, and a free length of 5 mm is used as the scooping sheet 60. The scooping sheet 60 is in contact with the intermediate transfer belt 13 with light pressure, and rubes the intermediate transfer belt 13 at the scooping sheet contact nip 62. With this configuration, a gap between the cleaning container 32 and the intermediate transfer belt 13 is eliminated, so that toner leaking out of the cleaning container 32 (frame body) can be reduced or suppressed.

Toner collected by the cleaning blade 31 is conveyed to a waste toner containing unit (not illustrated) described below.

Next, a structure to convey toner within the cleaning container 32 according to the present exemplary embodiment will be described with reference to FIGS. 3A and 3B and FIG. 4.

Figure 4:
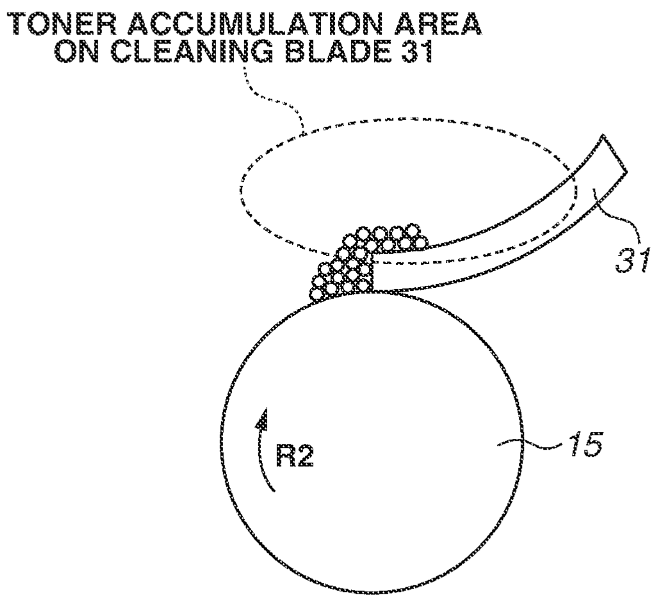
FIG. 4 is a conceptual diagram illustrating a state of toner collected by the cleaning blade.

FIG. 4 is a conceptual diagram illustrating a state where toner is collected by the cleaning blade 31 according to the present exemplary embodiment.

As illustrated in FIG. 4, in the present exemplary embodiment, toner is accumulated on an upper part of the cleaning blade 31 because the cleaning blade 31 is disposed on the upper side of the intermediate transfer belt 13. If toner is excessively accumulated on the upper part, a pressure applied to the cleaning blade 31 is increased, which results in occurrence of a cleaning failure caused by spilling of toner out of the cleaning blade 31 and an aggregation of toner on the cleaning blade 31. In the present exemplary embodiment, in order to prevent toner from being accumulated in the vicinities including front and upper parts of the cleaning blade 31, a conveyance structure to convey toner in the vicinities of the cleaning blade 31 is employed.

<Agitation Member>

Next, a conveyance structure (including an agitation member 70) according to the present exemplary embodiment will be described with reference to FIGS. 3A and 3B.

The conveyance structure according to the present exemplary embodiment can be divided into two parts. The first part is a mechanism which conveys toner to the second part to prevent toner from being accumulated on the front and the upper parts of the cleaning blade 31. The second part is a mechanism which conveys toner conveyed from the first part to the waste toner containing unit (not illustrated) disposed outside the cleaning container 32.

First, the first part of the conveyance structure will be described.

In order to prevent toner collected by the cleaning blade 31 from being accumulated and packed, the first part of the conveyance structure is configured of the agitation member 70.

The agitation member 70 includes a rotation shaft 71 that rotates in a rotation direction R3 (=R2) which is the same as the rotation direction of the intermediate transfer belt 13, and an agitation sheet 72 that is elastically deformable. The agitation sheet 72 is mounted on the rotation shaft 71 and rotated together with the rotation shaft 71. Further, the agitation sheet 72 comes into contact with the second side surface **31*f* of the cleaning blade 31 on the side opposite to the first side surface 31*e* that is in contact with the intermediate transfer belt 13**.

Specifically, the agitation member 70 includes the rotation shaft 71 (shaft portion) interlocking with a driving source and the agitation sheet 72 (sheet portion) fixed to the rotation shaft 71.

One end of the agitation sheet 72 is adhered and fixed to one surface of the rotation shaft 71 with a double-sided adhesive tape. In other words, one end portion of the agitation sheet 72 is fixed to the rotation shaft 71 with the double-sided adhesive tape, and another end portion of the agitation sheet 72 serves as a free end 73 (also called "a free end 73 of the agitation member 70").

The agitation sheet 72 is adhered to the rotation shaft 71 in such a manner that the free end 73 extends in a direction in which a force from the upstream side to the downstream side in the rotation direction of the rotation shaft 71 acts on the agitation sheet 72 and the agitation sheet 72 is pressed against the double-sided adhesive tape. In this way, coming-off of the agitation sheet 72 from the double-sided adhesive tape can be prevented when the agitation member 70 receives force (reactive force) from toner conveyed by the agitation member 70. Further, in the present exemplary embodiment, the agitation member 70 interlocks with a driving source of a process unit of the image forming apparatus 100, and is rotated at a rotation speed of 3 turns (cycles) per second.

The agitation member 70 can have a width not longer than or equal to the length of the cleaning blade 31 in the lengthwise direction, as long as the width of the agitation member 70 is wider than a printing area corresponding to a residual toner remaining area where toner is remained when normal printing is executed. Thus, the rotation shaft 71 is configured of a rectangular parallelepiped member having a 2-millimeter-square at a cross-sectional surface orthogonal to an axis direction and a length of 225 mm that is equal to or longer than a length of the printing area or a length of the agitation sheet 72 described below.

In the present exemplary embodiment, a mylar sheet is used for the agitation sheet 72, and the agitation sheet 72 has a width of 220 mm, i.e., a width greater than or equal to the width of a printing area of a letter-size sheet. The agitation sheet 72 has a free length of 4 mm from the rotation shaft 71, which is long enough to cause the agitation sheet 72 to come into contact with the cleaning blade 31.

Since the agitation sheet 72 comes into contact with the cleaning blade 31, toner accumulated on the upper part of the cleaning blade 31 can be conveyed efficiently, and accumulation of toner can be reduced or suppressed. With this configuration, increase in pressure caused by toner accumulated on the cleaning blade 31 can be reduced or suppressed effectively.

Since the agitation member 70 is rotated in the same direction as the rotation direction of the intermediate transfer belt 13, in the vicinity of the cleaning blade 31, the free end 73 of the agitation member 70 is moved in a direction opposite to the surface movement direction of the intermediate transfer belt 13.

If the agitation member 70 is rotated in a direction opposite to the rotation direction of the intermediate transfer belt 13, in a vicinity of the cleaning blade 31, the agitation member 70 conveys toner from the free end 31*b* of the cleaning blade 31 toward a fixed end of the cleaning blade 31. In this case, there is a risk that the free end 73 of the agitation member 70 comes into contact with the free end 31*b* of the cleaning blade 31 which serves as a collection surface for residual toner collection. Consequently, an impact of the contact between the toner conveyed by the agitation member 70 or the free end 73 of the agitation member 70 and the cleaning blade 31 likely results in a cleaning failure. Thus, in the present exemplary embodiment, the agitation member 70 is rotated in the same direction as the rotation direction of the intermediate transfer belt 13.

Further, the agitation member 70 conveys toner to the second part (not illustrated) of the conveyance structure to prevent toner to be accumulated at a predetermined amount or more on the upper part of the scooping sheet 60 or the cleaning blade 31.

Hereinafter, toner conveyance from the first part (agitation member 70) to the second part of the conveyance structure will be described with reference to FIGS. 5A and 5B.

Figure 5A:
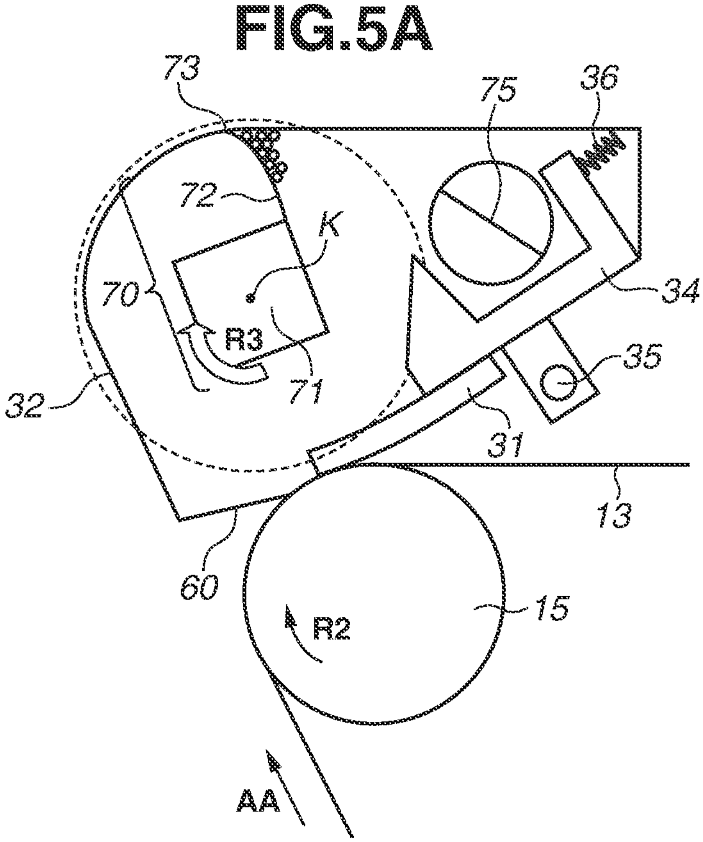
FIGS. 5A and 5B are conceptual diagrams each illustrating a toner conveyance state in a rotation of an agitation member according to the first exemplary embodiment.
Figure 5B:
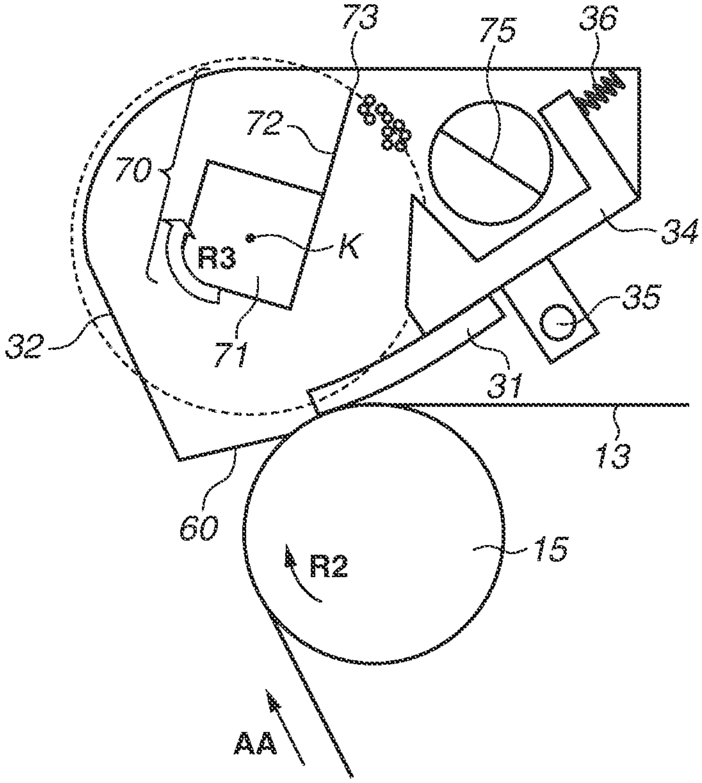

FIGS. 5A and 5B are conceptual diagrams each illustrating a toner conveyance state in the rotation of the agitation member 70 according to the present exemplary embodiment.

Specifically, FIG. 5A illustrates a state where the agitation member 70 conveys toner upward. In this operation, as illustrated in FIG. 5A, it is desirable that the agitation member 70 rubes against the inner wall surface of the cleaning container 32. According to the present exemplary embodiment, a distance from a rotation axis center of the agitation member 70 to the inner wall surface of the cleaning container 32 is 5 mm, and the free length of the agitation sheet 72 is designed in such a manner that a distance from the rotation center to the leading end of the agitation sheet 72 is more than 5 mm.

FIG. 5B illustrates a state immediately after the agitation member 70 is released (elastically restored) from a contact state (flexibly deformed state) with respect to the inner wall surface. As illustrated in FIG. 5B, toner conveyed upward by the agitation member 70 is flicked by a restoration force of when the agitation member 70 in contact with the inner wall surface of the cleaning container 32 is released from the contact state.

The flicked toner is conveyed to the waste toner containing unit (not illustrated) arranged on the outside of the cleaning container 32 by the second part of the conveyance structure.

The second part of the conveyance structure includes a screw member 75. As illustrated in FIG. 5B, the screw member 75 is disposed in an area to which the flicked toner is conveyed when the agitation member 70 is released from the contact state.

The screw member 75 having a spiral-shape is also rotated in conjunction with the driving source of the process unit. Toner conveyed by the agitation member 70 is further conveyed by the screw member 75 to an end portion on one side in the width direction of the intermediate transfer belt 13 which is orthogonal to the rotation direction of the intermediate transfer belt 13.

In the present exemplary embodiment, the screw member 75 conveys toner to the outside of the cleaning container 32 in a depth direction in FIG. 3A. The toner is then further conveyed to the waste toner containing unit (not illustrated) using a different conveyance member (not illustrated).

The above-described conveyance structure conveys toner collected by the cleaning blade 31 to the outside of the cleaning container 32, and further conveys to the waste toner container unit (not illustrated).

In the above-described way, it is possible to prevent toner inside the cleaning container 32 from being excessively accumulated in a vicinity (upper part) of the free end 31*b* of the cleaning blade 31.

Next, a first comparison example as a comparison with the present exemplary embodiment will be described with reference to FIGS. 6 to 8.

Figure 6:
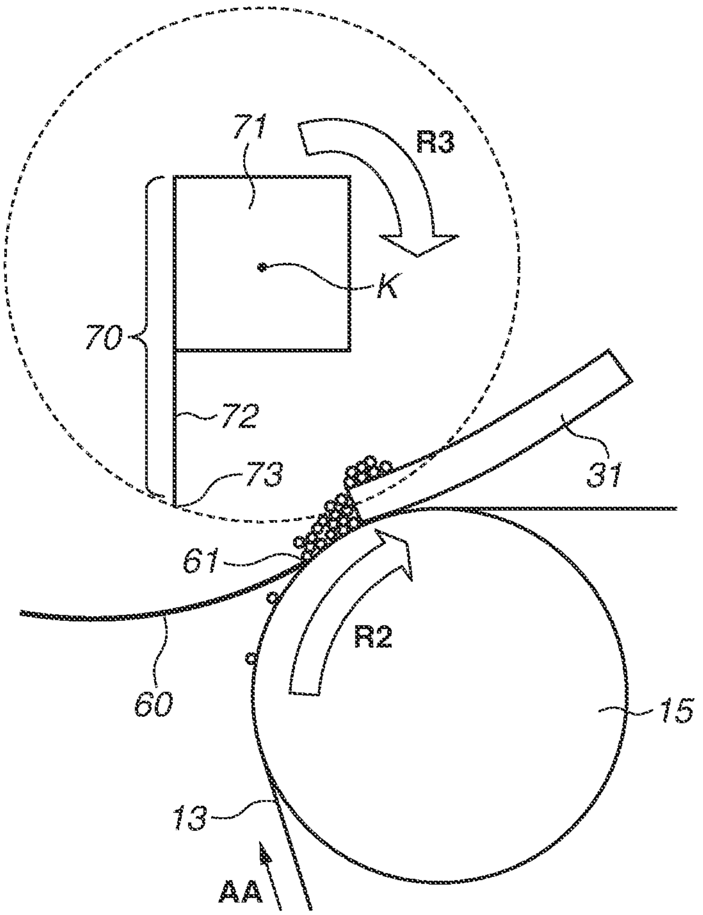
FIG. 6 is a conceptual diagram illustrating a toner collecting state of the belt cleaning unit according to a first comparison example of the first exemplary embodiment.

FIG. 6 is a conceptual diagram illustrating a state of toner collected by the belt cleaning unit 30 according to the first comparison example of the present exemplary embodiment.

Specifically, FIG. 6 illustrates a state where toner is collected by the scooping sheet 60 and the cleaning blade 31 of the first comparison example.

In the first comparison example, similar to the present exemplary embodiment described above, the scooping sheet 60 is disposed to reduce or suppress leakage of toner inside the cleaning container 32. As illustrated in FIG. 6, the scooping sheet 60 is disposed in such a manner that the free end 61 of the scooping sheet 60 faces toward the cleaning blade 31.

Figure 7:
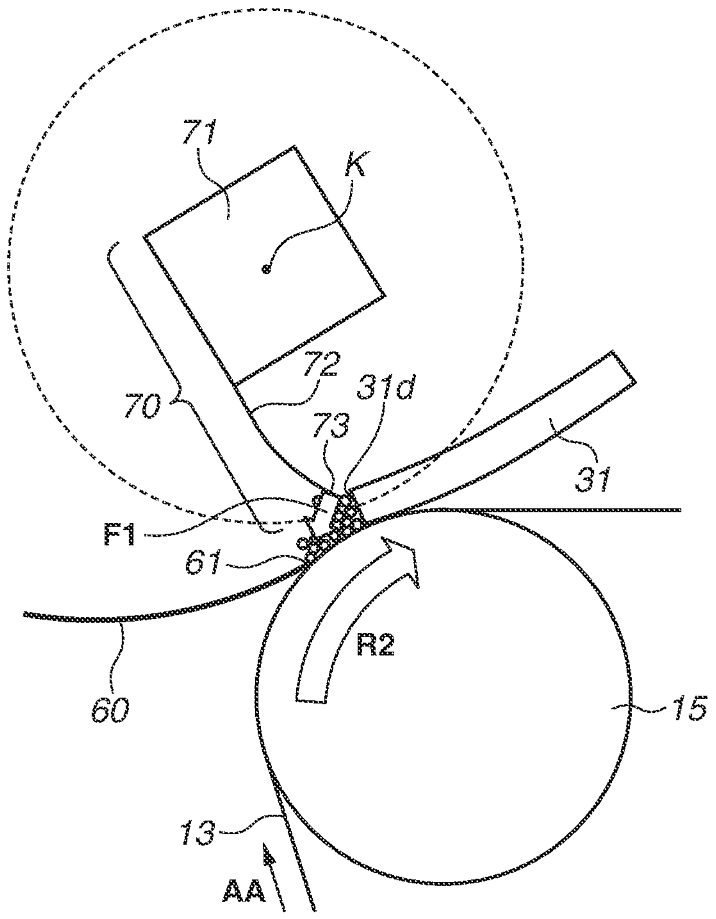
FIG. 7 is a conceptual diagram illustrating a state where the agitation member of the belt cleaning unit according to the first comparison example pushes toner to a side of a scooping sheet.

FIG. 7 is a conceptual diagram illustrating a state where the agitation member 70 included in the belt cleaning unit 30 according to the first comparison example pushes toner to a side of the scooping sheet 60. FIG. 8 is a conceptual diagram illustrating a state where the toner pushed by the agitation member 70 of the belt cleaning unit 30 according to the first comparison example leaks out of a nip portion between the scooping sheet 60 and the intermediate transfer belt 13.

Specifically, FIG. 7 illustrates a state where toner on the cleaning blade 31 is conveyed by the agitation member 70. After a short time from a state illustrated in FIG. 7, toner is slipped out of the scooping sheet 60 and drops downward as illustrated in FIG. 8.

As illustrated in FIG. 7, in the first comparison example, because the agitation member 70 conveys toner while being in contact with the upper part of the cleaning blade 31, when the free end 73 of the agitation member 70 is released from the upper part of the cleaning blade 31, the toner is flicked by a force caused by the agitation member 70 being released.

In particular, toner is strongly flicked toward the scooping sheet 60 from the blade non-contact end portion 31*d* when the agitation member 70 is released from the free end 31*b* of the cleaning blade 31. Specifically, as illustrated in FIG. 7, when the agitation member 70 in the rotation operation is separated from the blade non-contact end portion 31*d*, toner is pushed in a direction of an arrow F1.

Figure 8:
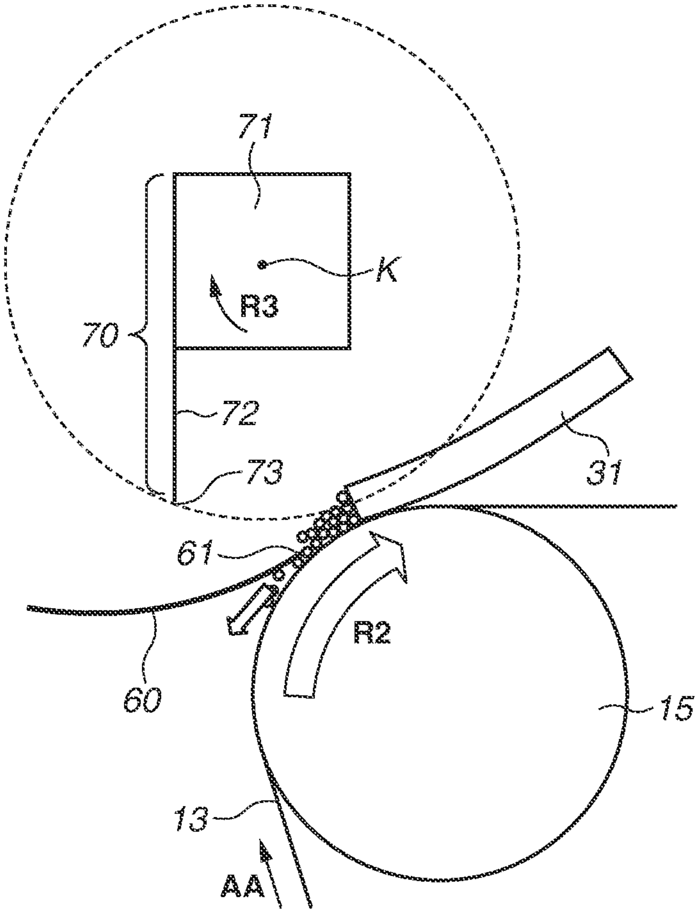
FIG. 8 is a conceptual diagram illustrating a state where the toner pushed by the agitation member of the belt cleaning unit according to the first comparison example leaks from a nip portion between the scooping sheet and the belt.

In this operation, as illustrated in FIG. 8, a force of pushing toner out of the free end 61 of the scooping sheet 60 is generated because the free end 61 of the scooping sheet 60 faces in the direction of the arrow F1 which is a toner flowing direction. Consequently, there is a possibility that toner leaks out of the free end 61 of the scooping sheet 60.

Leaking of toner out of the scooping sheet 60 of the cleaning container 32 leads to occurrence of image defects caused by contamination of the secondary transfer roller 25 due to toner scattered on the secondary transfer portion N2 or adhesion of toner to the transfer material P passing through the secondary transfer portion N2.

Herein, a phenomenon in which toner leaks out of the scooping sheet 60 of the cleaning container 32 is called “toner dripping”.

In the present disclosure, in order to reduce or suppress the toner dripping caused by leakage of toner, a detailed examination has been conducted while paying attention to the arrangement of the scooping sheet 60.

Specifically, in the present disclosure, by making the free end 61 of the scooping sheet 60 hardly receive the force of the agitation member 70 pushing toner, an amount of toner pushed by the agitation member 70 and leaking out of the scooping sheet 60 can be reduced, whereby occurrence of image defects caused by the toner dripping is reduced or suppressed.

First, a direction of the force of the agitation member 70 pushing toner and a flow of toner according to the present exemplary embodiment of the present disclosure will be described with reference to FIG. 9.

Figure 9:
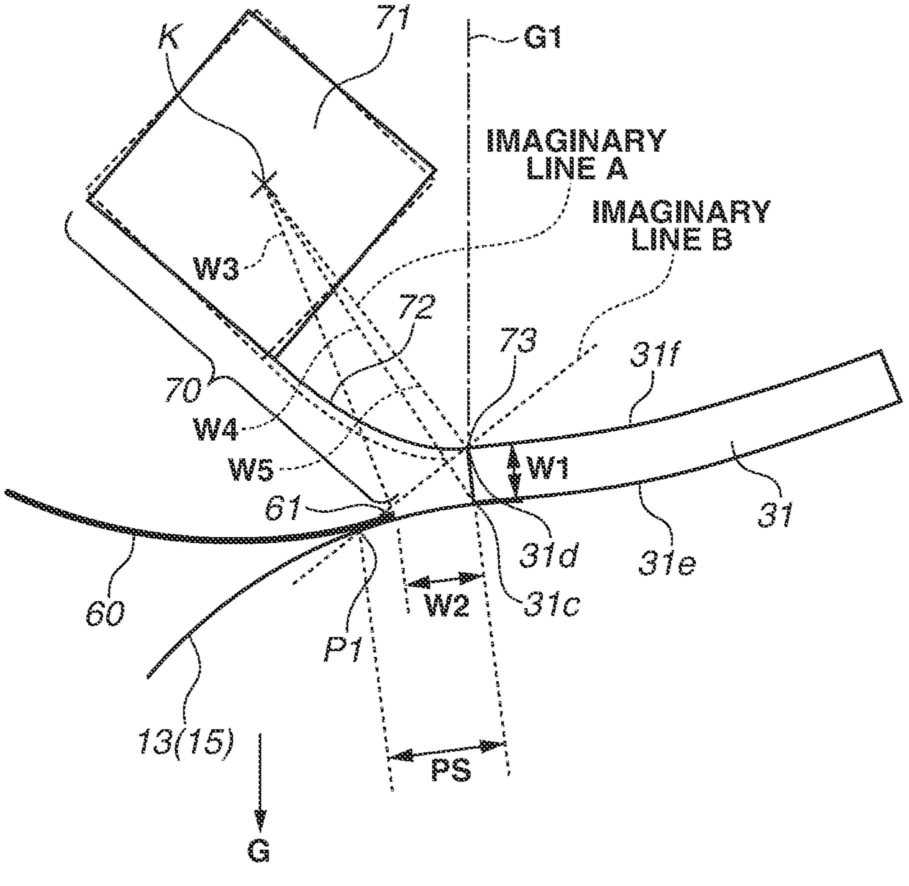
FIG. 9 is a conceptual diagram illustrating a positional relationship between the cleaning blade, the agitation member, and the scooping sheet according to the first exemplary embodiment, which also illustrates a state where the agitation member rubbed against the cleaning blade is to be released (restored) from a rubbed state (elastically deformed state).

FIG. 9 is a conceptual diagram illustrating a positional relationship between the cleaning blade 31, the agitation member 70, and the scooping sheet 60 according to the present exemplary embodiment, which also illustrates a state where the agitation member 70 rubbing the cleaning blade 31 is to be released (restored) from a rubbing state (elastically deformed state).

FIG. 9 illustrates a minute change occurring at a timing of when the free end 73 of the agitation member 70 is separated from the cleaning blade 31.

As illustrated in FIG. 9, the agitation member 70 is rotated about a rotation center K (axial center position) serving as a rotation axis. A pushing force along a tangential line direction of the blade non-contact end portion 31*d* becomes the greatest when the free end 73 of the agitation member 70 is separated (released) from the blade non-contact end portion 31*d* of the cleaning blade 31.

FIG. 9 illustrates a state immediately before and immediately after the free end 73 of the agitation member 70 is separated from the blade non-contact end portion 31*d*. The free end 73 of the agitation member 70 immediately before the separation is indicated by a solid line, and the free end 73 immediately after the separation is indicated by a dashed line.

The moving direction of the free end 73 of the agitation member 70 from a state immediately before the separation to a state immediately after the separation, by the rotation operation, is a direction along a second imaginary line (imaginary line B) which is passing through the blade non-contact end portion 31*d*. And the imaginary line B is orthogonal to a first imaginary line (imaginary line A) which is connecting the rotation center K and the blade non-contact end portion 31*d*.

Accordingly, when the free end 73 of the agitation member 70 is separated from the blade non-contact end portion 31*d*, the force of pushing toner is applied in a direction parallel to the imaginary line B.

Next, a difference between the configuration according to the present exemplary embodiment in FIG. 9 and a configuration according to the first comparison example in FIG. 10 will be described.

Figure 10:
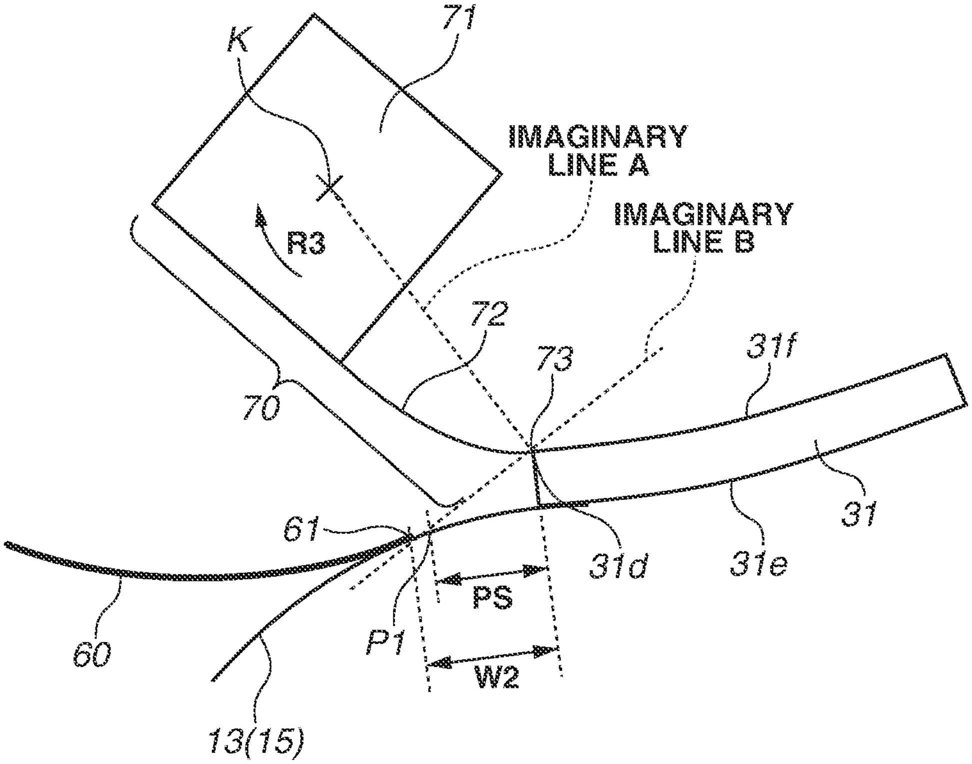
FIG. 10 is a conceptual diagram illustrating a positional relationship between the cleaning blade, the agitation member, and the scooping sheet according to the first comparison example.

FIG. 10 is a conceptual diagram illustrating a positional relationship between the cleaning blade 31, the agitation member 70, and the scooping sheet 60 according to the first comparison example of the present exemplary embodiment.

As can be seen from the comparison between the configurations illustrated in FIGS. 9 and 10, in the present exemplary embodiment, the free end 61 of the scooping sheet 60 is disposed in such a manner that the free end 61 is in a position closer to the cleaning blade 31 than an intersection point P1 (intersecting position) where the imaginary line B intersects with the intermediate transfer belt 13. In other words, in the present exemplary embodiment, the free end 61 of the scooping sheet 60 is at a position between the intersection point P1 and the free end 31*b* of the cleaning blade 31 in the rotation direction of the intermediate transfer belt 13.

On the other hand, in the first comparison example, the free end 61 of the scooping sheet 60 is disposed at a position away from the cleaning blade 31 than the intersection point P1. In other words, the intersection point P1 is disposed at a position between the free end 61 of the scooping sheet 60 and the free end 31*b* of the cleaning blade 31 in the rotation direction of the intermediate transfer belt 13.

In a case where the free end 61 of the scooping sheet 60 is disposed at a position away from the cleaning blade 31 than the intersection point P1 of the imaginary line B, the force of the agitation member 70 pushing toner is likely to be exerted on the free end 61 of the scooping sheet 60.

Accordingly, in the first comparison example, the free end 61 of the scooping sheet 60 receives the force of pushing toner, and the toner dripping occurs as a result.

In the present exemplary embodiment, in comparison with the first comparison example, the setting position of the scooping sheet 60 is appropriately designed to reduce or suppress the toner dripping caused by the force in the pushing direction. The toner dripping occurs when the force of the agitation member 70 pushing toner is exerted on the free end 61 of the scooping sheet 60. According to the configuration of the present exemplary embodiment, the force of pushing toner is hardly exerted on the free end 61 of the scooping sheet 60. To prevent the force of the agitation member 70 pushing toner from being exerted on the free end 61, the free end 61 of the scooping sheet 60 is disposed at a position between the intersection point P1 and the free end 31*b* of the cleaning blade 31.

Next, a feature of the present exemplary embodiment, which is a positional relationship between the cleaning blade 31, the agitation member 70, and the scooping sheet 60, will be described with reference to FIGS. 9 and 11.

Figure 11:
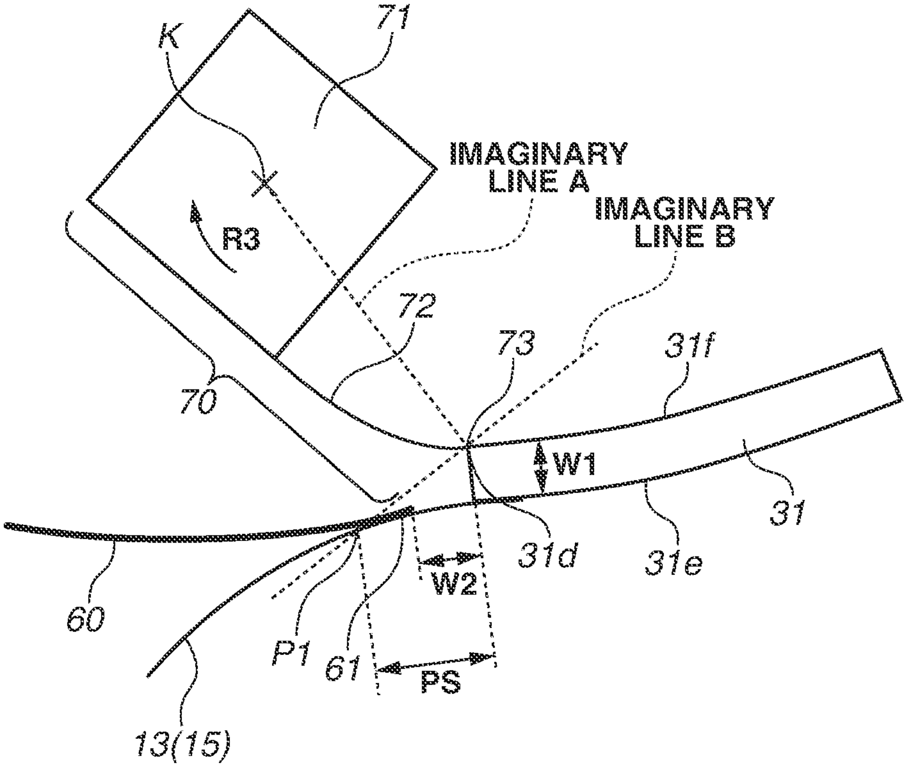
FIG. 11 is a conceptual diagram illustrating a positional relationship between the cleaning blade, the agitation member, and the scooping sheet according to the first exemplary embodiment.

FIG. 11 is a conceptual diagram illustrating a positional relationship between the cleaning blade 31, the agitation member 70, and the scooping sheet 60 according to the present exemplary embodiment. FIG. 11 specifically illustrates a distance W2 between the free end 61 of the scooping sheet 60 and the free end 31*b* of the cleaning blade 31.

As illustrated in FIG. 9, the force exerted on toner can be obtained by drawing the imaginary line A (line orthogonal to the imaginary line A) connecting the rotation center K and the blade non-contact end portion 31*d*, and then drawing the imaginary line B which is a vertical line of the imaginary line A and passes through the blade non-contact end portion 31*d*.

In a case where the free end 61 of the scooping sheet 60 is disposed at a position closer to the cleaning blade 31 than the intersection point P1 where the imaginary line B intersects with the intermediate transfer belt 13, the cleaning blade 31 (thickness W1) acts as a wall when the agitation member 70 pushes the toner.

Accordingly, in a case where the free end 61 of the scooping sheet 60 is disposed at a position closer to the cleaning blade 31 than the position of the intersection point P1 (see FIG. 11), it is possible to reduce an area of the free end 61 of the scooping sheet 60 where the force of the agitation member 70 pushing toner is exerted.

Accordingly, in the present exemplary embodiment, the free end 61 of the scooping sheet 60 is disposed at a position closer to the cleaning blade 31 than the intersection point P1 where the imaginary line B intersects with the intermediate transfer belt 13.

Further, as illustrated in the below-described first variation example of the present exemplary embodiment, in a case where the free end 61 of the scooping sheet 60 is disposed at a position closer to the cleaning blade 31 than the intersection point P1, the free end 61 can be disposed at a position that is between the intersection point P1 and the free end 31*b* of the cleaning blade 31 and is closer to the cleaning blade 31 than to the intersection point P1.

If the free end 61 of the scooping sheet 60 is too close to the cleaning blade 31 and comes into contact with the cleaning blade 31, a cleaning failure or the toner dripping may occur (see a second comparison example described below). In the present exemplary embodiment, the scooping sheet 60 is disposed upstream from the cleaning blade 31 in the rotation direction of the intermediate transfer belt 13, whereby the scooping sheet 60 does not come into contact with the cleaning blade 31.

In order to reduce or suppress occurrence of image defects more efficiently, for example, it is desirable that a distance W2 between the free end 61 of the scooping sheet 60 and the cleaning blade 31 is set to a value of fifty times or more of a toner size (average grain size K) (W2≥50×K1). More desirably, the distance W2 is set to a value of seventy times or more of the toner size.

For example, in the present exemplary embodiment, a toner size (average grain size) is 7 μm. Accordingly, the distance W2 between the cleaning blade 31 and the free end 61 of the scooping sheet 60 can be set to 0.35 mm or more. More desirably, the distance W2 is set to 0.49 mm or more.

Next, a first variation example (first and second experimental examples) of the present exemplary embodiment will be described with reference to FIG. 12. Further, a second comparison example with respect to the present exemplary embodiment and the first variation example will be described with reference to FIG. 13.

Figure 12:
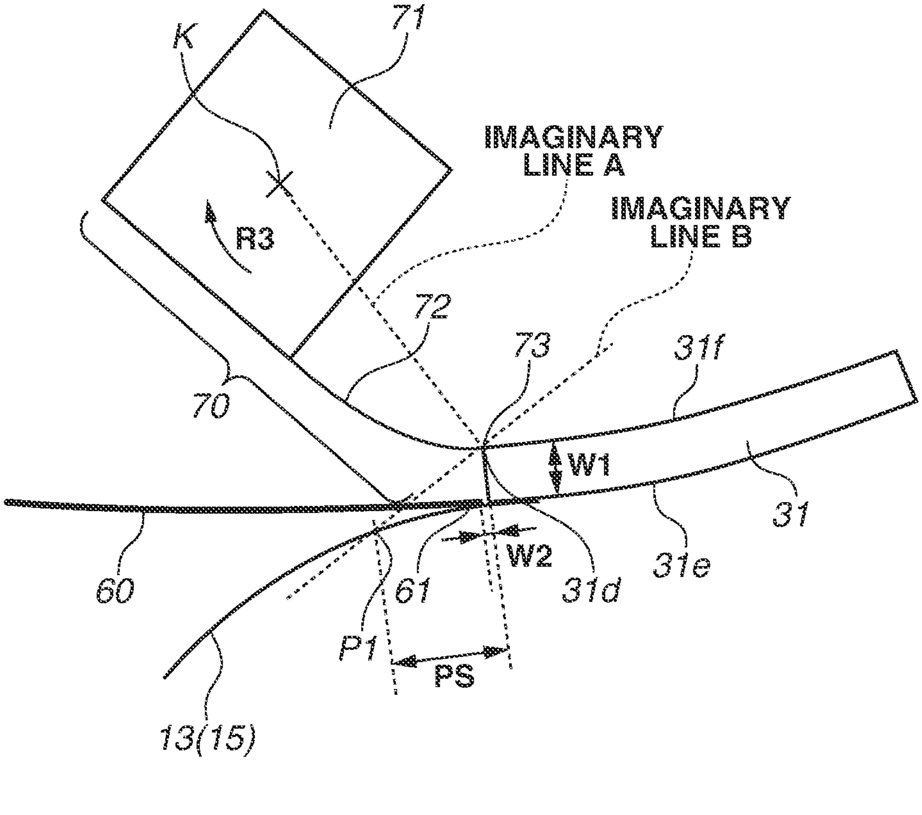
FIG. 12 is a conceptual diagram illustrating a position of a leading end of the scooping sheet according to a first variation example of the first exemplary embodiment.

FIG. 12 is a conceptual diagram illustrating a position of a leading end of the scooping sheet 60 according to the first variation example of the present exemplary embodiment.

Figure 13:
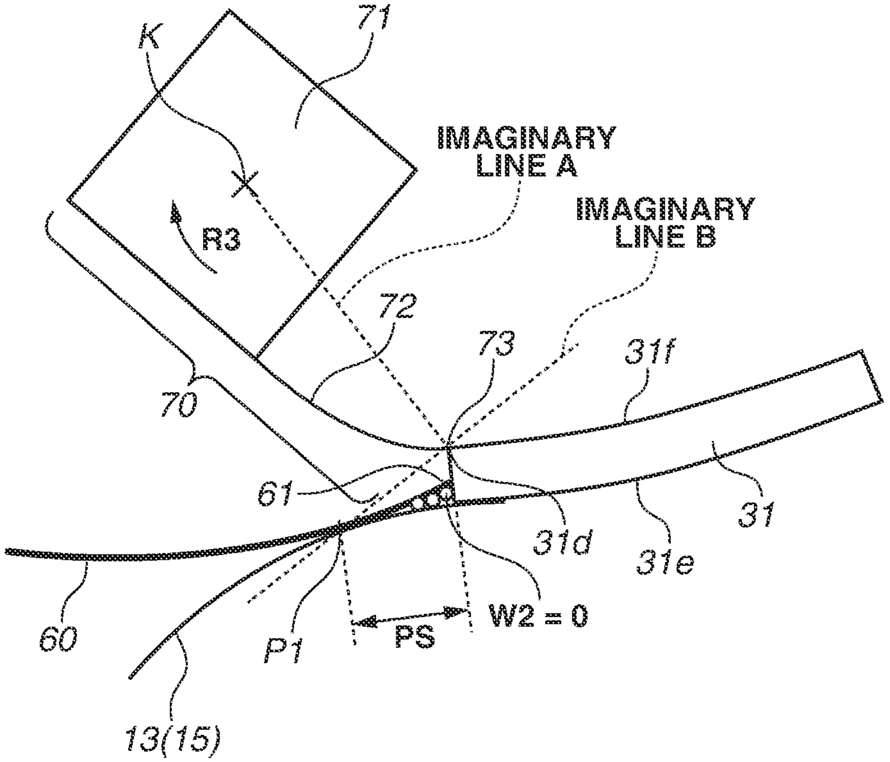
FIG. 13 is a conceptual diagram illustrating a position of a leading end of the scooping sheet according to a second comparison example of the first exemplary embodiment.

FIG. 13 is a conceptual diagram illustrating a position of a leading end of the scooping sheet 60 according to a second comparison example with respect to the first variation example of the present exemplary embodiment.

As described above, in a case where the free end 61 of the scooping sheet 60 is disposed at a position closer to the cleaning blade 31 than the intersection point P1 of the imaginary line B by the force of the agitation member 70 pushing toner, it is possible to reduce the force of the agitation member 70 pushing toner exerted on the free end 61 of the scooping sheet 60.

However, as illustrated in FIG. 13, in the second comparison example, because the free end 61 of the scooping sheet 60 is too close and is in contact with the cleaning blade 31, collection of toner collected by the cleaning blade 31 is interrupted by the scooping sheet 60 and the toner cannot be conveyed to the inner side of the cleaning container 32.

Consequently, as illustrated in FIG. 13, toner may likely be accumulated on a front part of the scooping sheet 60 and the cleaning blade 31. In this case, cleaning failure may occur in the cleaning blade 31. As a result, the scooping sheet 60 is lifted up by the toner, and a possibility of occurrence of the toner dripping is increased.

The toner dripping is less likely to occur if toner collected by the cleaning blade 31 can pass through a gap between the scooping sheet 60 and the cleaning blade 31. In other words, the toner dripping can be reduced or suppressed with the configuration having an appropriate gap (distance W2) described in the first variation example of the present disclosure illustrated in FIG. 12.

In a case where a large amount of toner is collected at one time when the gap is narrow or nearly zero as in the second comparison example illustrated in FIG. 13, toner particles are likely to collide with each other and hardly pass through the gap.

In the present exemplary embodiment, because a gap between the scooping sheet 60 and the cleaning blade 31 is set to a value greater than zero, i.e., the free end 61 of the scooping sheet 60 is disposed upstream from the free end 31*b* of the cleaning blade 31, occurrence of the toner dripping is reduced or suppressed.

Particularly, by setting a gap (distance W2) to a value of fifty times or more of a toner size (an average grain size of the toner particle), a significant effect can be acquired with respect to the above described issues. In other words, the positional relationship is configured in such a manner that a relationship W2≥50×K1 is satisfied when the average grain size of a toner particle is K1.

As described above, in order to reduce or suppress occurrence of the tonner dripping more efficiently, it is desirable that the scooping sheet 60 and the cleaning blade 31 are disposed with a gap of a predetermined distance or more.

As described above, in the present exemplary embodiment, in a state where the respective constituent elements are viewed from a direction parallel to the rotation axis direction of the rotation shaft 71, an imaginary line connecting a position of the end portion (blade non-contact end portion 31*d*) on the most upstream side of the second side surface 31*f* in the direction of the arrow R2 (rotation direction AA) of the intermediate transfer belt 13 and the axial center position K of the rotation shaft 71 can be specified as the first imaginary line A. Then, an imaginary line, which is orthogonal to the first imaginary line A, passing through a position of the end portion (blade non-contact end portion 31*d*) on the most upstream side of the second side surface 31*f* can be specified as the second imaginary line B. The free end 61 of the scooping sheet 60 is disposed at a position closer to the free end 31*b* of the cleaning blade 31 than the intersection position (intersection point) P1 where the second imaginary line B intersects with the outer circumferential surface of the intermediate transfer belt 13.

With this configuration, the force of the agitation member 70 pushing toner is hardly exerted on the free end 61 of the scooping sheet 60, whereby the toner dripping from the scooping sheet 60 can be reduced or suppressed.

Specifically, the free end 61 of the scooping sheet 60 can be disposed at a position away from the cleaning blade 31 by the distance W2 having a value of fifty times or more of the toner size. In this way, the force of the agitation member 70 pushing toner is hardly exerted on the free end 61 of the scooping sheet 60, whereby the toner dripping from the scooping sheet 60 can be reduced or suppressed more efficiently.

In the present exemplary embodiment, a thickness from the blade contact end portion 31*c* to the blade non-contact end portion 31*d* of the free end 31*b* is the thickness W1 (in the present exemplary embodiment, the thickness W1 is 2 mm), and the cleaning blade 31 acts as a wall standing in a path of the agitation member 70.

Thus, the agitation member 70 hardly reaches a region in a vicinity of the cleaning blade 31. In other words, the agitation member 70 hardly reaches the region within the thickness W1 of the cleaning blade 31. Accordingly, a distance between the scooping sheet 60 and the cleaning blade 31 is set to a value equal to or less than the thickness of the cleaning blade 31.

In other words, when a thickness between the first side surface 31*e* and the second side surface 31*f* of the cleaning blade 31 is W1, and a distance between the free end 61 of the scooping sheet 60 and the free end 31*b* of the cleaning blade 31 is W2, a relationship W1≥W2 is satisfied.

As described above, in order to reduce or suppress occurrence of image defects more efficiently, it is desirable that the distance W2 between the cleaning blade 31 and the scooping sheet 60 is set to a value of fifty times or more of the toner size and equal to or less than the thickness W1 of the cleaning blade 31.

Further, as illustrated in FIG. 9, in the present exemplary embodiment, the axial center position K of the rotation shaft 71 in the in-use posture can be disposed on the upper side of the end portion (blade non-contact end portion 31*d*) on the most upstream side of the second side surface 31*f* in a gravity direction G. In other words, in the configuration illustrated in FIG. 9, because the force of the agitation member 70 pushing toner is applied from the upper side in the gravity direction G, it is expected that a risk of image defects is high in comparison to the case where the force is not applied or hardly applied from the upper side in the gravity direction G. According to the present exemplary embodiment, even in the configuration illustrated in FIG. 9, a risk of image defects can sufficiently be reduced by disposing the free end 61 of the scooping sheet 60 at a position closer to the free end 31*b* of the cleaning blade 31 than the intersection point P1.

Further, as illustrated in FIG. 9, in the present exemplary embodiment, with respect to a vertical line G1 passing through a position of the end portion (blade contact end portion 31*c*) on the most upstream side of the first side surface 31*e*, the axial center position K of the rotation shaft 71 is disposed on the same side of the scooping sheet 60 in a state where the respective constituent elements are viewed from a direction parallel to the rotation axis direction of the rotation shaft 71.

In other words, in the configuration illustrated in FIG. 9, because the force of the agitation member 70 pushing toner is exerted on the scooping sheet 60 rather than the free end 31*b* of the cleaning blade 31, it is expected that the toner dripping is high in comparison with the case where the force is not exerted on the scooping sheet 60. According to the present exemplary embodiment, even in the configuration illustrated in FIG. 9, the toner dripping can be sufficiently reduced by the configuration having the free end 61 of the scooping sheet 60 at a position closer to the free end 31*b* of the cleaning blade 31 than the intersection point P1.

Further, as illustrated in FIG. 9, in the present exemplary embodiment, the shortest distance between the axial center position K of the rotation shaft 71 and the free end 61 of the scooping sheet 60 in the in-use posture can be specified as W3, in a state where the respective constituent elements are viewed in a direction parallel to the rotation axis direction of the rotation shaft 71. When a distance between the axial center position K of the rotation shaft 71 and the position of the end portion (blade contact end portion 31*c*) on the most upstream side of the first side surface 31*e* can be specified as W4, and a distance between the axial center position K of the rotation shaft 71 and the position of the end portion (blade non-contact end portion 31*d*) on the most upstream side of the second side surface 31*f* can be specified as W5, a relationship W4>W3>W5 is satisfied.

Next, the effect of the present exemplary embodiment and the first variation example will be described more specifically by making a comparison between the first and second comparison examples.

In each of the exemplary embodiments, the variation examples, and the comparison examples of the present disclosure, a distance PS between the intersection point P1 and the cleaning blade 31 is set to 3.5 mm.

In the first comparison example illustrated in FIG. 10, the free end 61 of the scooping sheet 60 is disposed at a position away from the cleaning blade 31 (distance W2=4 mm) than the intersection point P1 of the imaginary line B passing through the blade non-contact end portion 31*d*. In the second comparison example illustrated in FIG. 13, the free end 61 of the scooping sheet 60 is in contact with the cleaning blade 31 (distance W2=0).

On the other hand, in the present exemplary embodiment illustrated in FIG. 11, the free end 61 of the scooping sheet 60 is at a position closer to the cleaning blade 31 (distance W2=2 mm, in the present exemplary embodiment) than the intersection point P1. In the first experimental example of the first variation example of the present exemplary embodiment illustrated in FIG. 12, the distance W2 between the free end 61 of the scooping sheet 60 and the cleaning blade 31 is 0.2 mm. In the second experimental example of the first variation example, the distance W2 is 0.4 mm.

As shown in the following table 1, occurrence of the toner dripping is reduced or suppressed more effectively in the present exemplary embodiment and the first variation example in comparison with the first and second comparison examples. Table 1 shows evaluation results.

TABLE 1

| | Distance W2 between Free End of Scooping Sheet and Free End of Cleaning Blade (Distance PS between Intersection Point P1 and Free End of Cleaning Blade is 3.5 mm (PS = 3.5 mm)) | Toner Leakage (Toner Dripping) |
|---|---|---|
| First Exemplary Embodiment | 2 mm (<PS; >0.49 mm) | ○ |
| First Variation Example of First Exemplary Embodiment (First Experimental Example) | 0.2 mm (>0; <0.35 mm < PS) | ▲ |
| First Variation Example of First Exemplary Embodiment (Second Experimental Example) | 0.4 mm (>0; >0.35 mm; <0.49 mm < PS) | ● |
| First Comparison Example | 4 mm (>PS) | x |
| Second Comparison Example | 0 (Contact State) | x |

<Relationship between Distance from Scooping Sheet to Cleaning Blade and Dripping Toner>

○: No leakage was observed.

●: Almost no leakage was observed.

▲: Only a small amount of leakage was observed.

×: A considerable amount of leakage was observed.

<Mounting Angle of Cleaning Blade>

Next, a mounting angle of the cleaning blade 31 according to the present exemplary embodiment will be described with reference to FIGS. 14 and 15.

Figure 14:
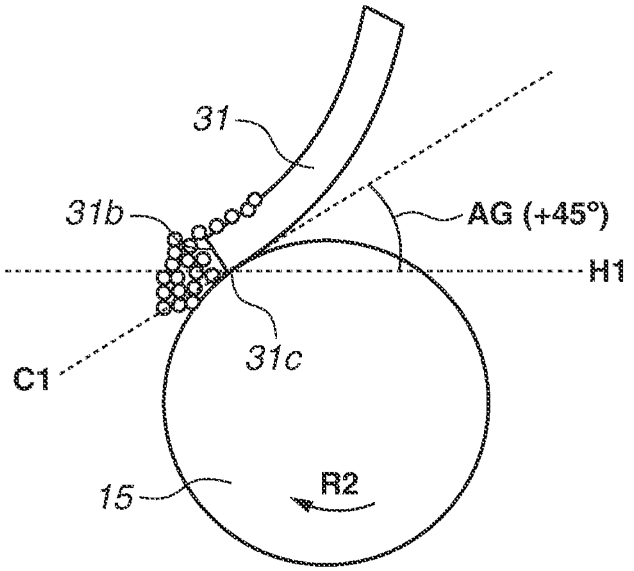
FIG. 14 is a conceptual diagram illustrating an example of a mounting condition of the cleaning blade according to the first exemplary embodiment.

FIG. 14 is a conceptual diagram illustrating an example of a mounting condition of the cleaning blade 31 according to the present exemplary embodiment. FIG. 15 is a conceptual diagram illustrating another example of the mounting condition of the cleaning blade 31 according to the present exemplary embodiment.

Figure 15:
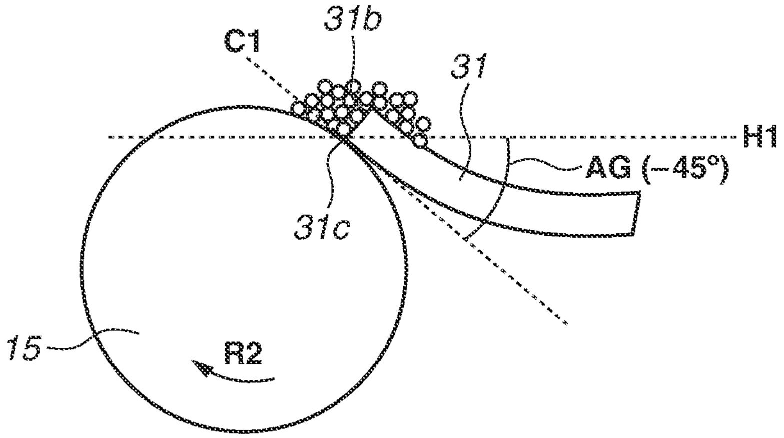
FIG. 15 is a conceptual diagram illustrating another example of the mounting condition of the cleaning blade according to the first exemplary embodiment.

As illustrated in FIGS. 14 and 15, the mounting angle of the cleaning blade 31 in the in-use posture can optionally be set within a range of −45 degrees (see FIG. 14) to +45 degrees (see FIG. 15) with respect to the horizontal direction. In other words, at the mounting angle between −45 degrees to +45 degrees, collected toner is accumulated on the upper part of the cleaning blade 31.

In other words, in the present exemplary embodiment, in a state where the respective constituent elements are viewed in a direction parallel to the rotation axis direction of the rotation shaft 71, the blade contact end portion 31*c* on the most upstream side of the first side surface 31*e* of the cleaning blade 31 is in contact with the intermediate transfer belt 13 in the direction of the arrow R2 (rotation direction AA) of the intermediate transfer belt 13. An angle AG formed by the tangential line C1 of the intermediate transfer belt 13 and a horizontal line H1 at a contact point (blade contact end portion 31*c*) between the blade contact end portion 31*c* on the most upstream side of the first side surface 31*e* and the intermediate transfer belt 13 can be set to 45 degrees or less.

In the above-described configuration, the agitation member 70 is disposed in a vicinity of the cleaning blade 31, and toner can be conveyed in the lengthwise direction. In other words, by using the agitation member 70, an amount of toner accumulated on the upper part of the cleaning blade 31 can be reduced. Accordingly, excessive rise of pressure applied to the intermediate transfer belt 13 disposed below the cleaning blade 31 is reduced or suppressed, and the cleaning performance of the cleaning blade 31 can be improved.

Further, in the configuration of the cleaning blade 31 illustrated in FIG. 14 or 15, a position of the free end 61 of the scooping sheet 60 can also be set similarly to the first exemplary embodiment illustrated in FIG. 3A.

In addition, in the present exemplary embodiment illustrated in FIG. 3A, the rotation shaft 71 of the agitation member 70 is disposed on the upper left side of the blade non-contact end portion 31*d*. However, as long as the agitation member 70 can remove toner from the cleaning blade 31, the rotation shaft 71 can be disposed at a position different from the position illustrated in FIG. 3A.

Next, a second exemplary embodiment of the present disclosure will be described with reference to FIG. 16.

Figure 16:
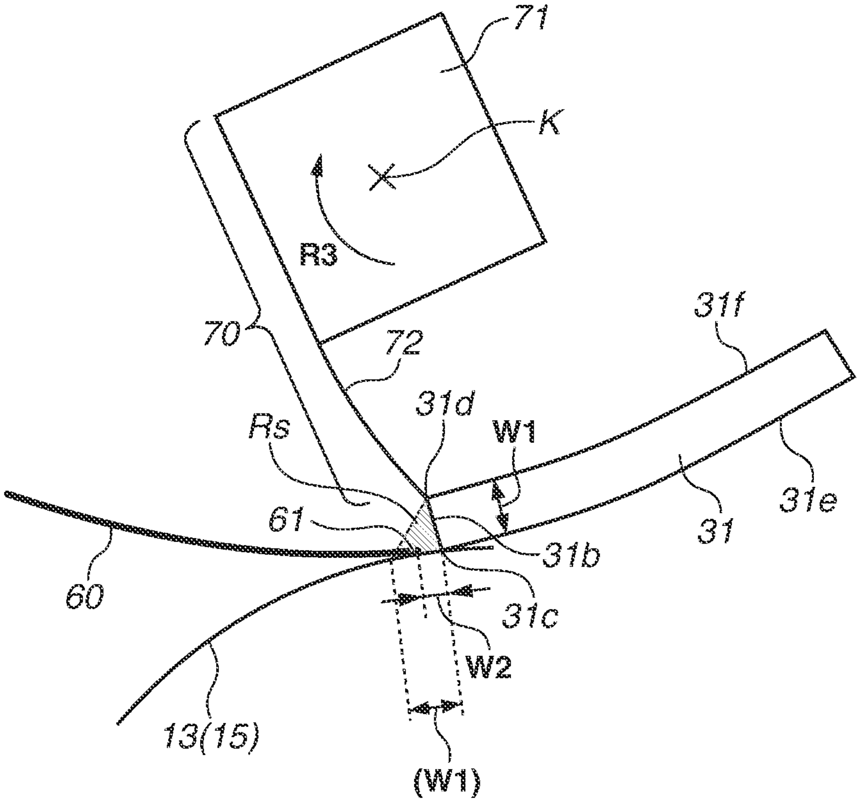
FIG. 16 is a conceptual diagram illustrating main parts of the belt cleaning unit and the belt of the image forming apparatus according to a second exemplary embodiment of the present disclosure.

FIG. 16 is a conceptual diagram illustrating main parts of the belt cleaning unit 30 and the intermediate transfer belt 13 of the image forming apparatus 100 according to the present exemplary embodiment of the present disclosure.

As illustrated in FIG. 16, a thickness from the blade contact end portion 31*c* to the blade non-contact end portion 31*d* of the free end 31*b* is the thickness W1, and the cleaning blade 31 acts as a wall standing in a path of the agitation member 70. Consequently, the agitation member 70 hardly reaches a region Rs in the vicinity of the cleaning blade 31. In other words, the agitation member 70 hardly reaches the region within the thickness W1 of the cleaning blade 31.

As illustrated in FIG. 16, in the present exemplary embodiment, a distance between the scooping sheet 60 and the cleaning blade 31 can be set to a value equal to or less than the thickness of the cleaning blade 31.

In other words, when a thickness between the first side surface 31*e* and the second side surface 31*f* of the cleaning blade 31 is W1, and a distance between the free end 61 of the scooping sheet 60 and the free end 31*b* of the cleaning blade 31 is W2, a relationship W1≥W2 is satisfied.

In the present exemplary embodiment, similar to the first exemplary embodiment, it is desirable that the distance W2 between the cleaning blade 31 and the scooping sheet 60 is set to a value of fifty times or more of the toner size and equal to or less than the thickness W1 of the cleaning blade 31 to reduce or suppress occurrence of image defects more efficiently.

In other words, the image forming apparatus 100 according to the present exemplary embodiment includes the intermediate transfer belt 13, the cleaning blade 31, the scooping sheet 60, and the agitation member 70.

The intermediate transfer belt 13 is a rotatable endless belt which bears a toner image.

The cleaning blade 31 has the free end 31*b* and collects toner from the intermediate transfer belt 13. The free end 31*b* is in contact with the intermediate transfer belt 13 and extends upstream in the rotation direction AA of the intermediate transfer belt 13.

The scooping sheet 60 is disposed upstream from the cleaning blade 31 in the direction of the arrow R2 (rotation direction AA) of the intermediate transfer belt 13, and the free end 61 of the scooping sheet 60 extends toward the downstream side and is in contact with the intermediate transfer belt 13.

The agitation member 70 includes the rotation shaft 71 rotated in the rotation direction R3 (=R2), which is the same direction as the rotation direction of the intermediate transfer belt 13, and the agitation sheet 72. The agitation sheet 72 that is elastically deformable is mounted on the rotation shaft 71 and rotated together with the rotation shaft 71.

The agitation sheet 72 comes into contact with the second side surface 31*f* of the cleaning blade 31 disposed on the opposite side of the first side surface 31*e* which is in contact with the intermediate transfer belt 13. Then, the agitation sheet 72 can come into contact with the blade non-contact end portion 31*d* on the most upstream side of the second side surface 31*f* in the direction of the arrow R2 (rotation direction AA) of the intermediate transfer belt 13.

When a thickness between the first side surface 31*e* and the second side surface 31*f* of the cleaning blade 31 is W1, and a distance between the free end 61 of the scooping sheet 60 and the free end 31*b* of the cleaning blade 31 is W2, a relationship W1≥W2 is satisfied.

The present exemplary embodiment can achieve the effect similar to the effect achieved by the first exemplary embodiment. In other words, in a configuration in which the agitation member 70 is disposed in a vicinity of the cleaning blade 31 and the scooping sheet 60, it is possible to reduce toner leaking to the outside during the rotation of the agitation member 70.

In the present exemplary embodiment illustrated in FIG. 16, the rotation shaft 71 of the agitation member 70 is disposed on the upper left side of the blade non-contact end portion 31*d*. However, as long as the agitation member 70 can remove toner from the cleaning blade 31, the rotation shaft 71 can be disposed at a position different from the position illustrated in FIG. 16.

In other words, the configuration of the agitation member 70 may be any configuration as long as toner is scraped by the agitation member 70 coming into contact with the upper part of the cleaning blade 31. Specifically, in the present exemplary embodiment, the rotation shaft 71 can be set in an area illustrated in FIG. 17.

Figure 17:
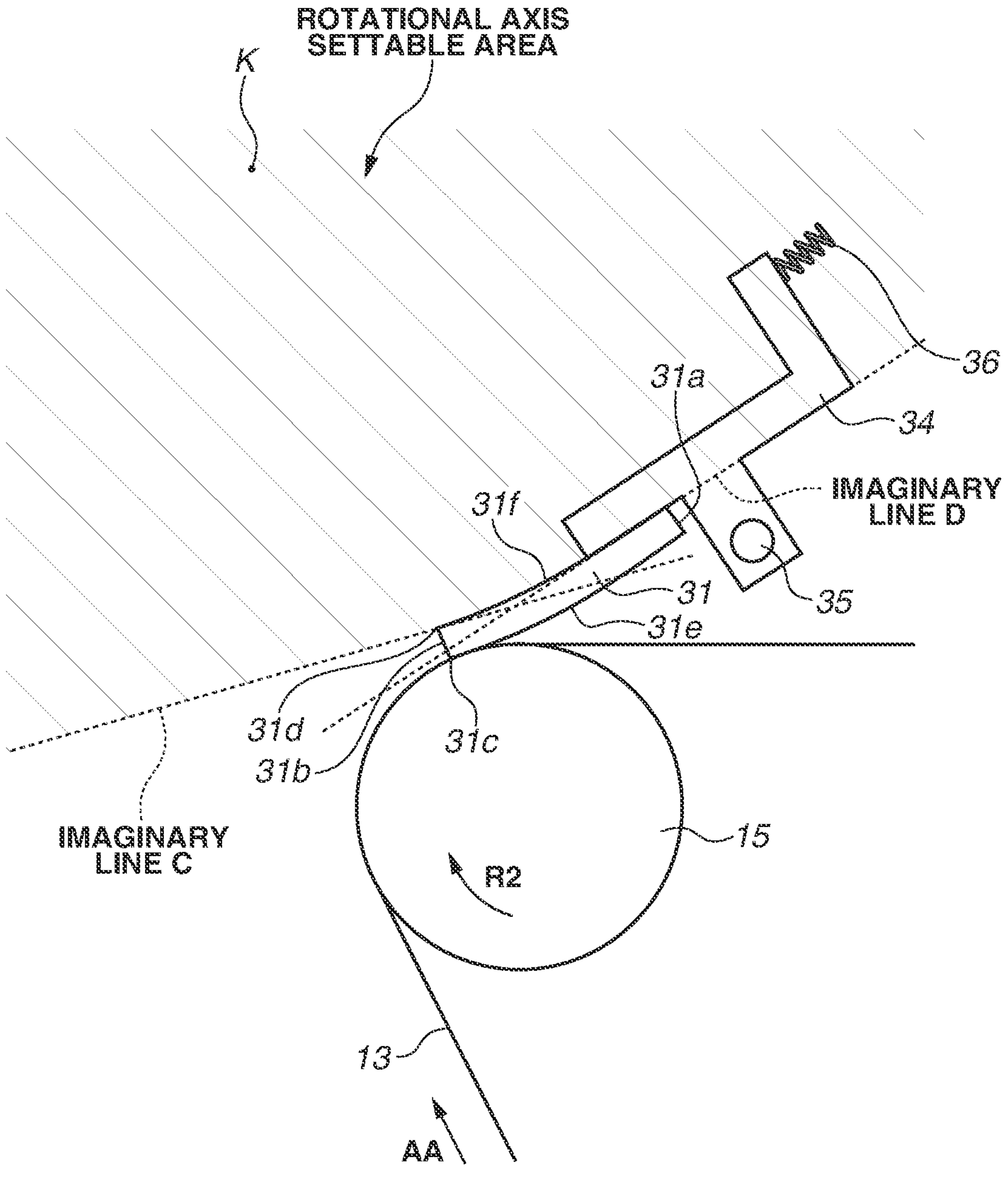
FIG. 17 is a conceptual diagram illustrating a rotational axis settable area of the agitation member according to the second exemplary embodiment.
Figure 18:
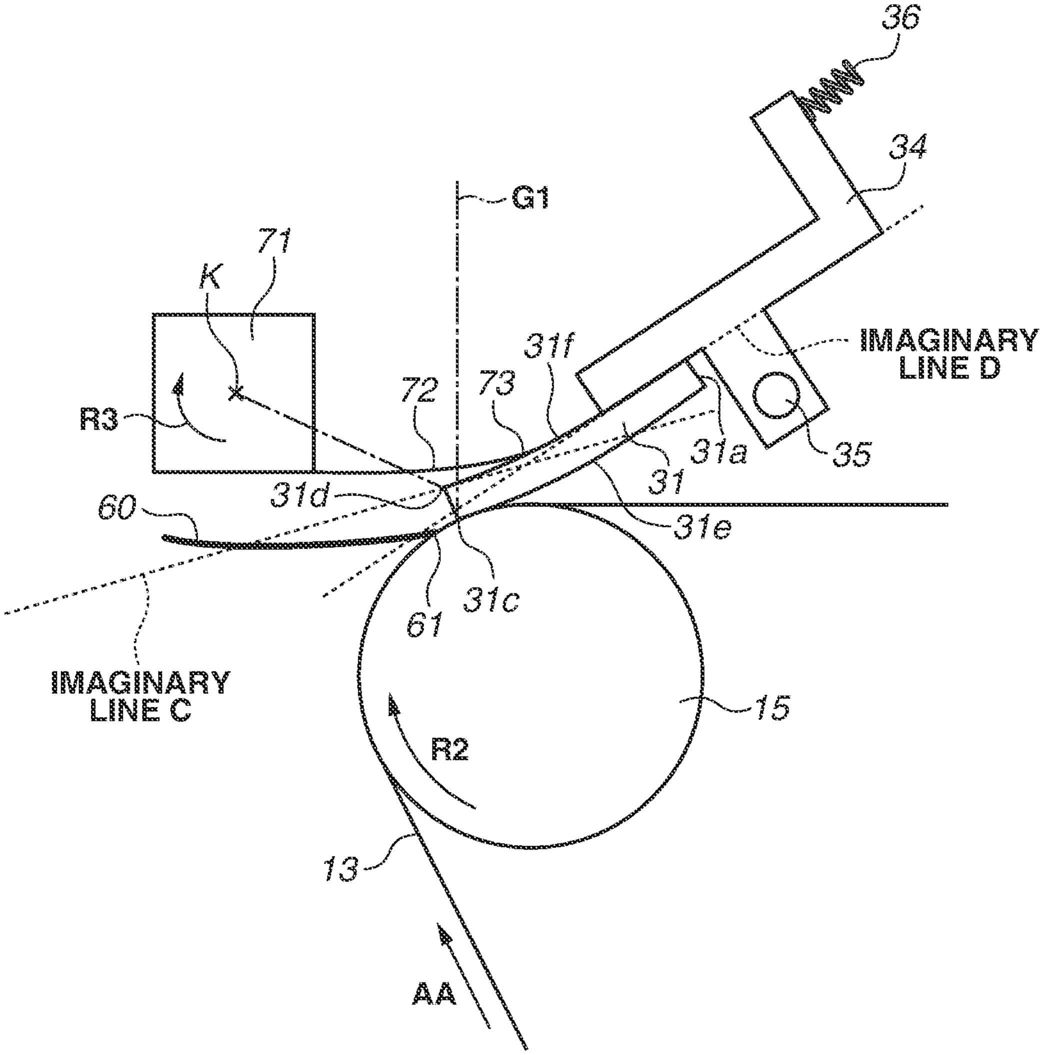
FIG. 18 is a conceptual diagram illustrating a cross-sectional view of the belt cleaning unit according to a first variation example of the second exemplary embodiment.
Figure 19:
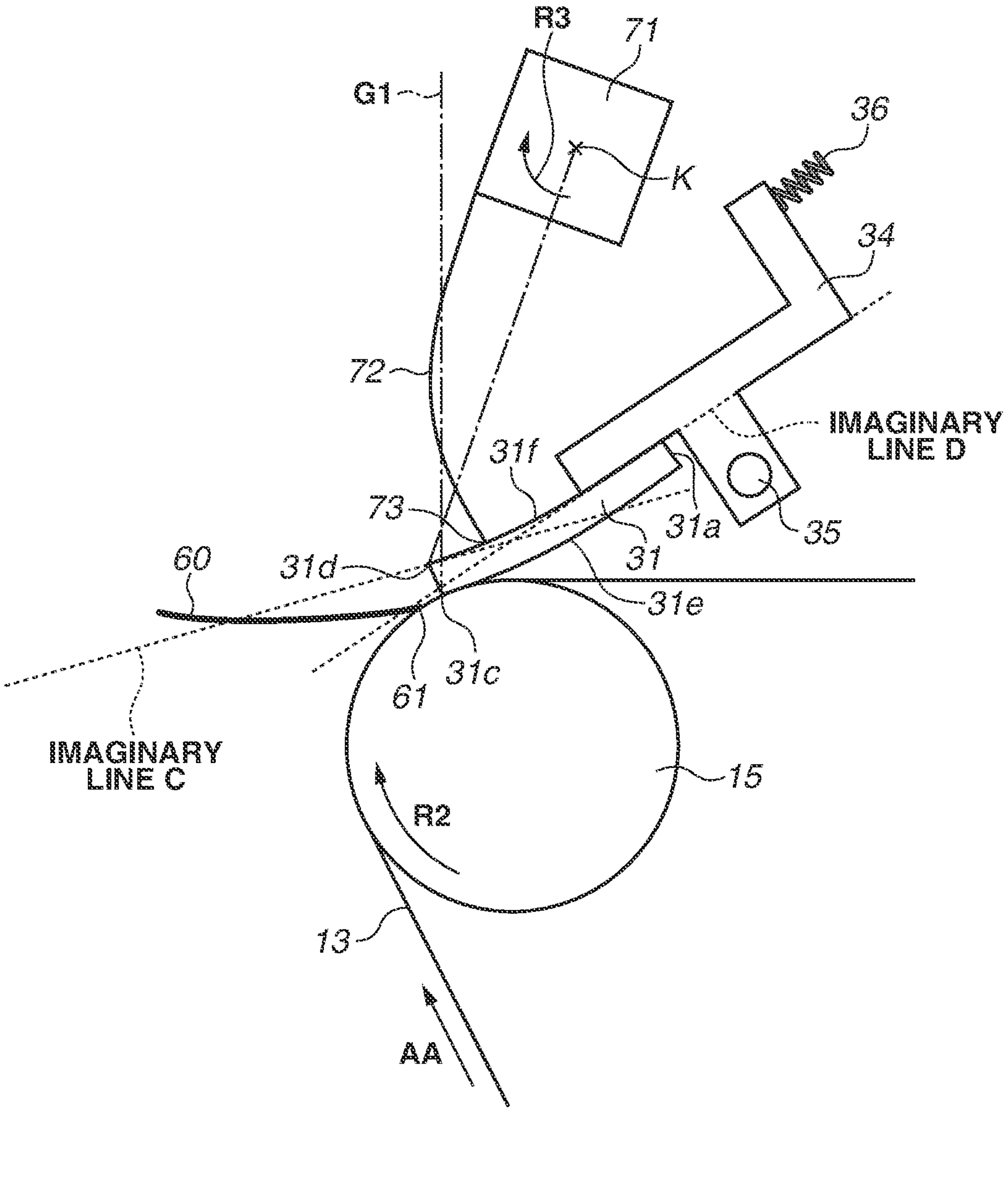
FIG. 19 is a conceptual diagram illustrating a cross-sectional view of the belt cleaning unit according to a second variation example of the second exemplary embodiment.

FIG. 17 is a conceptual diagram illustrating a rotation shaft mounting (mountable) area of the agitation member 70 according to the present exemplary embodiment. FIGS. 18 and 19 are conceptual diagrams illustrating cross-sectional views of the belt cleaning unit 30 according to the first and the second variation examples of the present exemplary embodiment.

More specifically, FIG. 17 illustrates a settable position where the rotation shaft 71 can be disposed. On the other hand, FIG. 18 or 19 illustrates a position of the rotation shaft 71.

First, as illustrated in FIG. 17, in the in-use posture, an imaginary line, which is parallel to the tangential line C1 of the intermediate transfer belt 13 at a contact position of the intermediate transfer belt 13 and the blade contact end portion 31*c* and passes through the blade non-contact end portion 31*d*, is specified as an imaginary line C (third imaginary line).

Then, an imaginary line which extends in a direction parallel to a surface direction of a surface of the supporting member 34 to which the second side surface 31*f* of the cleaning blade 31 is fixed and passes through a contact position of the fixed end 31*a* of the cleaning blade 31 and the supporting member 34, is specified as an imaginary line D (fourth imaginary line).

With respect to the imaginary lines C and D, the rotation shaft 71 can be disposed in an area opposite to a side of the intermediate transfer belt 13.

In other words, in a state where the respective constituent elements are viewed in the rotation axis direction of the rotation shaft 71, an imaginary line, which is parallel to the tangential line C1 of the intermediate transfer belt 13 at the contact position of the cleaning blade 31 and the intermediate transfer belt 13 and passes through the blade non-contact end portion 31*d* on the most upstream side of the second side surface 31*f*, is specified as the third imaginary line C. Then, an imaginary line, which extends in a direction parallel to a surface direction of a surface of the supporting member 34 for supporting the cleaning blade 31 to which the second side surface 31*f* of the cleaning blade 31 is fixed and passes through a contact position of the fixed end 31*a* of the cleaning blade 31 and the supporting member 34, is specified as the fourth imaginary line D. With respect to the third and the fourth imaginary lines, the rotation shaft 71 can be disposed in an area on a side opposite to the intermediate transfer belt 13.

In other words, when the rotation shaft 71 of the agitation member 70 is disposed in the rotational axis settable area illustrated in FIG. 17, a configuration in which the free end 73 of the agitation member 70 is rotated while rubbing against the second side surface 31*f* of the cleaning blade 31 can easily be realized. Consequently, toner can be conveyed efficiently, and a degree of freedom in design can be increased.

In the first variation example of the present exemplary embodiment, as illustrated in FIG. 18, it is possible to set the vertical line G1 which passes through a position of the end portion (blade contact end portion 31*c*) on the most upstream side of the first side surface 31*e*, in a state where the respective constituent elements in the in-use posture are viewed in the rotation axis direction of the rotation shaft 71. Then, with respect to the vertical line G1, the axial center position K of the rotation shaft 71 can be disposed on the same side of the scooping sheet 60.

On the other hand, in the second variation example of the present exemplary embodiment, as illustrated in FIG. 19, it is possible to set the vertical line G1 which passes through a position of the end portion (blade contact end portion 31*c*) on the most upstream side of the first side surface 31*e*, in a state where the respective constituent elements in the in-use posture are viewed in the rotation axis direction of the rotation shaft 71. Then, with respect to the vertical line G1, the axial center position K of the rotation shaft 71 can be disposed on the opposite side of the scooping sheet 60.

As described above, when the agitation member 70 which is in the rotation operation and rubs the second side surface 31*f* of the cleaning blade 31 is separated from the blade non-contact end portion 31*d*, the agitation member 70 is likely to push toner to the outside. In the present exemplary embodiment, since the rotation shaft 71 is disposed in the rotational axis settable area, even in a case where the scooping sheet 60 rubs the second side surface 31*f* of the cleaning blade 31, it is possible to reduce the amount of toner pushed by the agitation member 70 and to prevent the toner from flowing toward the free end 61 of the scooping sheet 60. As a result, it is possible to reduce or suppress leakage of toner.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-025370, filed Feb. 22, 2022, which is hereby incorporated by reference herein in its entirety.

What is claimed is:

1. An image forming apparatus comprising:

a rotatable intermediate transfer belt configured to bear a toner image;

a supporting member;

a blade member fixed to the supporting member to be supported by the supporting member, the blade member being configured to collect developer on the intermediate transfer belt, the blade member including a first side surface in contact with the intermediate transfer belt and a second side surface which is on a side opposite to the first side surface in a thickness direction of the blade member, wherein a contact portion where the first side surface of the blade member is in contact with the intermediate transfer belt is disposed upstream from a position where the blade member is fixed to the supporting member in a rotation direction of the intermediate transfer belt;

a sheet member configured to be fixed to a container at one end thereof and be in contact with the intermediate transfer belt at an other end thereof serving as a free end; and an agitation member including a shaft portion rotatable about a rotation axis and a sheet portion mounted on the shaft portion to rotate with the shaft portion, wherein the sheet portion rotating with the shaft portion is configured to be elastically deformable and is configured to come into contact with the second side surface, and wherein, as viewed in a rotation axis direction of the shaft portion, a first line is an imaginary line which connects the rotation axis and a position of a most upstream side end of the second side surface in the rotation direction, a second line is an imaginary line which is orthogonal to the first line and passes through the position of the most upstream side end of the second side surface, and the free end of the sheet member is disposed at a position closer to the blade member than a position where the second line intersects with an outer circumferential surface of the intermediate transfer belt.

2. The image forming apparatus according to claim 1, wherein, as viewed in the rotation axis direction of the shaft portion, a relationship W1≥W2 is satisfied when a thickness of the blade member is W1, and a distance between the free end and the blade member is W2.

3. The image forming apparatus according to claim 2, wherein a relationship W2≥50×K1 is satisfied, when an average grain size of the developer is K1.

4. The image forming apparatus according to claim 2, wherein, in an in-use posture of the image forming apparatus, the rotational axis is disposed on an upper side of the end portion on the most upstream side of the second side surface in a gravity direction.

5. The image forming apparatus according to claim 4, wherein, in the in-use posture, as viewed in the rotation axis direction, the rotational axis is on a same side of the sheet member with respect to a vertical line which passes through a position of a most upstream side end of the first side surface.

6. The image forming apparatus according to claim 5, wherein, in the in-use posture, as viewed in the rotation axis direction, a relationship W4>W3>W5 is satisfied, when a shortest distance between the rotational axis and the free end of the sheet member is W3, a distance between the rotational axis and the position of the most upstream side end of the first side surface is W4, and a distance between the rotational axis and the position of the most upstream side end of the second side surface is W5.

7. The image forming apparatus according to claim 1, wherein, as viewed in the rotation axis direction, and when a position where a most upstream side end of the first side surface is in contact with the intermediate transfer belt is specified as a contact point, an angle formed between a tangential line of the intermediate transfer belt and a horizontal line at the contact point is 45 degrees or less.

8. The image forming apparatus according to claim 1 further comprising:

a photosensitive member configured to bear the toner image, wherein the intermediate transfer belt is an intermediate transfer belt on which the toner image borne on the photosensitive member is transferred.

9. An image forming apparatus comprising:

an intermediate transfer belt configured to rotate and bear a toner image;

a supporting member;

a blade member fixed to the supporting member to be supported by the supporting member, the blade member being configured to collect developer on the intermediate transfer belt, the blade member including a first side surface in contact with the intermediate transfer belt and a second side surface which is on a side opposite to the first side surface in a thickness direction of the blade member, wherein a contact portion where the first side surface of the blade member is in contact with the intermediate transfer belt is disposed upstream from a position where the blade member is fixed to the supporting member in a rotation direction of the intermediate transfer belt;

a sheet member configured to be fixed to a container at one end thereof and be in contact with the intermediate transfer belt at an other end thereof serving as a free end; and an agitation member including a shaft portion rotatable about a rotation axis and a sheet portion mounted on the shaft portion to rotate with the shaft portion, wherein the sheet portion rotating with the shaft portion is configured to be elastically deformable and is configured to come into contact with the second side surface, wherein, a position where the sheet member being configured to be in contact with the intermediate transfer belt is closer than a position where the blade member is fixed to the supporting member to a position where the blade member is in contact with the intermediate transfer member belt, and wherein, as viewed in a rotation axis direction of the shaft portion, a relationship W1≥W2 is satisfied, when a thickness of the blade member is W1 and a distance between the free end and the blade member is W2.

10. The image forming apparatus according to claim 9, wherein a relationship W2≥50×K1 is satisfied, when an average grain size of the developer is K1.

11. The image forming apparatus according to claim 9, wherein, in an in-use posture of the image forming apparatus, the rotational axis is disposed on an upper side of an end portion on a most upstream side of the second side surface in a gravity direction.

12. The image forming apparatus according to claim 11, wherein, in the in-use posture, as viewed in a rotation axis direction of the shaft portion, the rotational axis position is disposed on a same side of the sheet member with respect to a vertical line which passes through a position of a most upstream side end of the first side surface.

13. The image forming apparatus according to claim 12, wherein, in the in-use posture, as viewed in the rotation axis direction, a relationship W4>W3>W5 is satisfied, when a shortest distance between the rotational axis-axial center position and the free end of the sheet member is W3, a distance between the axial center position and the position of the most upstream side end of the first side surface is W4, and a distance between the rotational axis and the position of the most upstream side end of the second side surface is W5.

14. The image forming apparatus according to claim 9, wherein, as viewed in the rotation axis direction of the shaft portion of the shaft portion, and when a position where a most upstream side end of the first side surface is in contact with the intermediate transfer belt is specified as a contact point, an angle formed between a tangential line of the intermediate transfer belt and a horizontal line at the contact point is 45 degrees or less.

15. The image forming apparatus according to claim 9 further comprising:

a photosensitive member configured to bear the toner image, wherein the intermediate transfer belt is an intermediate transfer belt on which the toner image borne on the photosensitive member is transferred.

* * * * *